United States Patent
Grossman

(10) Patent No.: US 11,981,376 B2
(45) Date of Patent: *May 14, 2024

(54) SYSTEMS AND METHODS FOR AUTOMATIC AIR AND ELECTRICAL CONNECTIONS ON AUTONOMOUS CARGO VEHICLES

(71) Applicant: WAYMO LLC, Mountain View, CA (US)

(72) Inventor: William Grossman, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,179

(22) Filed: Apr. 3, 2023

(65) Prior Publication Data

US 2023/0234650 A1    Jul. 27, 2023

Related U.S. Application Data

(63) Continuation of application No. 16/007,688, filed on Jun. 13, 2018, now Pat. No. 11,643,154, which is a (Continued)

(51) Int. Cl.
*B62D 53/12* (2006.01)
*B60D 1/01* (2006.01)
(Continued)

(52) U.S. Cl.
CPC ........... *B62D 53/125* (2013.01); *B60D 1/015* (2013.01); *B60S 9/02* (2013.01); *B62D 53/0807* (2013.01); *B62D 53/0842* (2013.01); *B62D 53/06* (2013.01)

(58) Field of Classification Search
CPC ................... B62D 53/08–53/125; B60D 1/015
See application file for complete search history.

(56) References Cited

U.S. PATENT DOCUMENTS

| | | |
|---|---|---|
| 1,874,918 A | 8/1932 | Davis |
| 2,888,275 A | 5/1959 | Roy |

(Continued)

FOREIGN PATENT DOCUMENTS

| | | |
|---|---|---|
| CN | 107696806 A | 2/2018 |
| DE | 10159503 A1 | 6/2003 |

(Continued)

OTHER PUBLICATIONS

First Office Action issued in corresponding Chinese Patent Application No. 201980029576.1, dated May 11, 2023, 29 pages.

(Continued)

*Primary Examiner* — Jeffrey C Boomer
(74) *Attorney, Agent, or Firm* — Botos Churchill IP Law LLP

(57) ABSTRACT

The technology relates to autonomous vehicles having hitched or towed trailers for transporting cargo and other items between locations. Aspects of the technology provide a smart hitch connection between the fifth-wheel of a tractor unit and the kingpin of a trailer. This avoids requiring a person to make physical pneumatic and electrical connections between the fifth-wheel and kingpin using external hoses and cables. Instead, the necessary connections are made internally, autonomously. For instance, the fifth-wheel may provide air pressure via one or more slots arranged on a connection surface, and the trailer is configured to receive the air pressure through one or more openings on a contact surface of the kingpin. An electrical connection section of the fifth-wheel may also provide electrical signals and/or power to an electrical contact interface of the kingpin.

(Continued)

Rotational information about relative alignment of the trailer to the tractor unit may also be provided.

20 Claims, 20 Drawing Sheets

Related U.S. Application Data continuation-in-part of application No. 15/992,337, filed on May 30, 2018, now Pat. No. 10,807,660.

(51) Int. Cl.
*B60S 9/02* (2006.01)
*B62D 53/06* (2006.01)
*B62D 53/08* (2006.01)

(56) References Cited

U.S. PATENT DOCUMENTS

| | | | |
|---|---|---|---|
| 3,181,888 A | 5/1965 | Boylan et al. | |
| 3,428,334 A | 2/1969 | Hils | |
| 3,711,122 A | 1/1973 | Holmberg et al. | |
| 3,719,372 A | 3/1973 | Rawlings | |
| 3,734,537 A | 5/1973 | Holmberg et al. | |
| 4,679,158 A | 7/1987 | Tate | |
| 6,709,001 B1 | 3/2004 | Morgan et al. | |
| 7,581,746 B2 | 9/2009 | Abate et al. | |
| 8,505,949 B2 | 8/2013 | Temple et al. | |
| 8,736,820 B2 | 5/2014 | Choe et al. | |
| 9,662,955 B2 | 5/2017 | Popham et al. | |
| 9,674,490 B2 | 6/2017 | Koravadi | |
| 9,718,404 B2 | 8/2017 | Nallapa et al. | |
| 9,802,624 B2 | 10/2017 | Thor et al. | |
| 9,804,594 B2 | 10/2017 | Gariepy et al. | |
| 2006/0208873 A1 | 9/2006 | Lesesky et al. | |
| 2010/0066161 A1 | 3/2010 | Fry et al. | |
| 2011/0037241 A1 | 2/2011 | Temple et al. | |
| 2013/0078078 A1 | 3/2013 | Andre et al. | |
| 2013/0082453 A1 | 4/2013 | Padula | |
| 2013/0148748 A1 | 6/2013 | Suda | |
| 2016/0047646 A1 | 2/2016 | Ochsendorf et al. | |
| 2016/0304122 A1 | 10/2016 | Herzog et al. | |
| 2017/0217372 A1 | 8/2017 | Lu et al. | |
| 2017/0361844 A1 | 12/2017 | Kahn et al. | |
| 2018/0057052 A1 | 3/2018 | Dodd et al. | |
| 2018/0147905 A1 | 5/2018 | Macnamara et al. | |
| 2018/0178797 A1 | 6/2018 | Seaman et al. | |
| 2019/0064835 A1 | 2/2019 | Hoofard et al. | |
| 2019/0235519 A1 | 8/2019 | Carter et al. | |
| 2019/0241032 A1 | 8/2019 | Webster et al. | |

FOREIGN PATENT DOCUMENTS

| | | |
|---|---|---|
| DE | 102015115696 A1 | 3/2017 |
| EP | 1326772 A1 | 7/2003 |
| EP | 1326772 B1 | 3/2004 |
| EP | 1451059 B1 | 2/2007 |
| WO | 2002032744 A1 | 4/2002 |
| WO | 03047952 A1 | 6/2003 |
| WO | 03078238 A2 | 9/2003 |
| WO | 2003078238 A2 | 9/2003 |
| WO | 2010118420 A2 | 10/2010 |
| WO | 2018055321 A2 | 3/2018 |

OTHER PUBLICATIONS

Non Final Office Action for U.S. Appl. No. 16/007,688 dated Apr. 6, 2020.
Non-Final Office Action for U.S. Appl. No. 15/992,337 dated Mar. 12, 2020.
The Extended European Search Report for European Patent Application No. 19810705.4, dated Jan. 31, 2022.
"International Search Report and Written Opinion for Application No. PCT/US2019/034159 dated Sep. 20, 2019", 13 pages.
Bouzouraa, et al., "Laser Scanner based Road Surface Estimation for Automotive Applications", IEEE, 2014, 4 pages.
Shen, Truman, "Stereo Vision Based Road Surface Preview", IEEE 17th International Conference on Intelligent Transportation Systems (ITSC), Qingdao, China, Oct. 8-11, 2014, pp. 1843-1849.

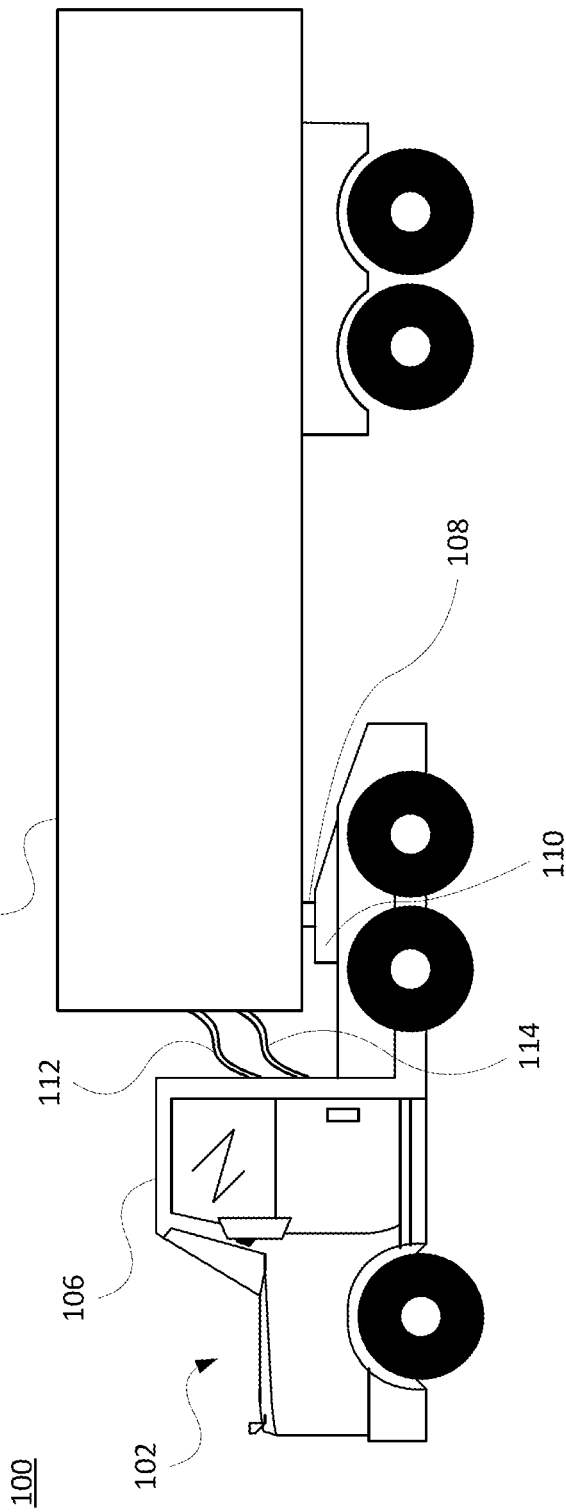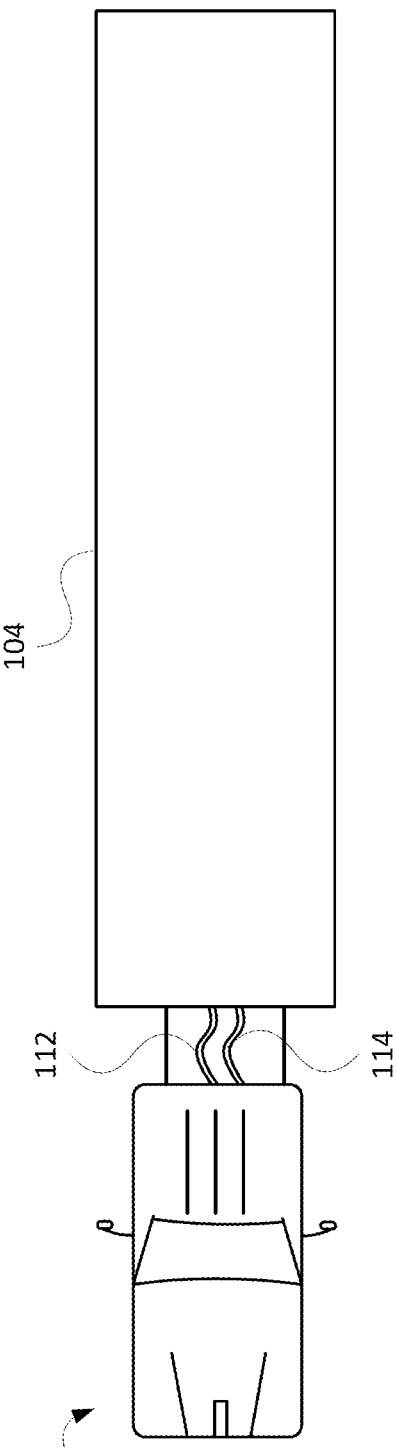

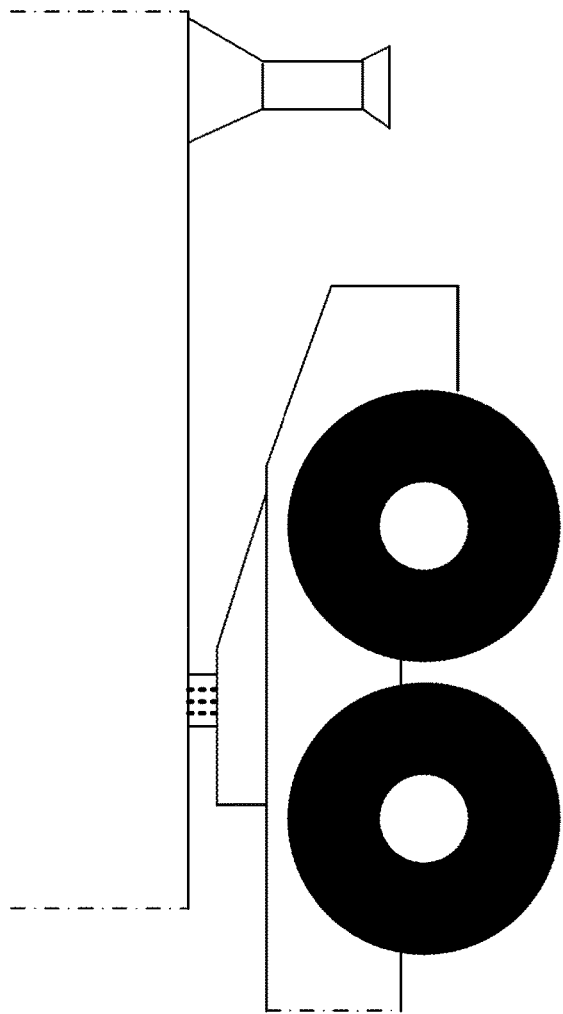
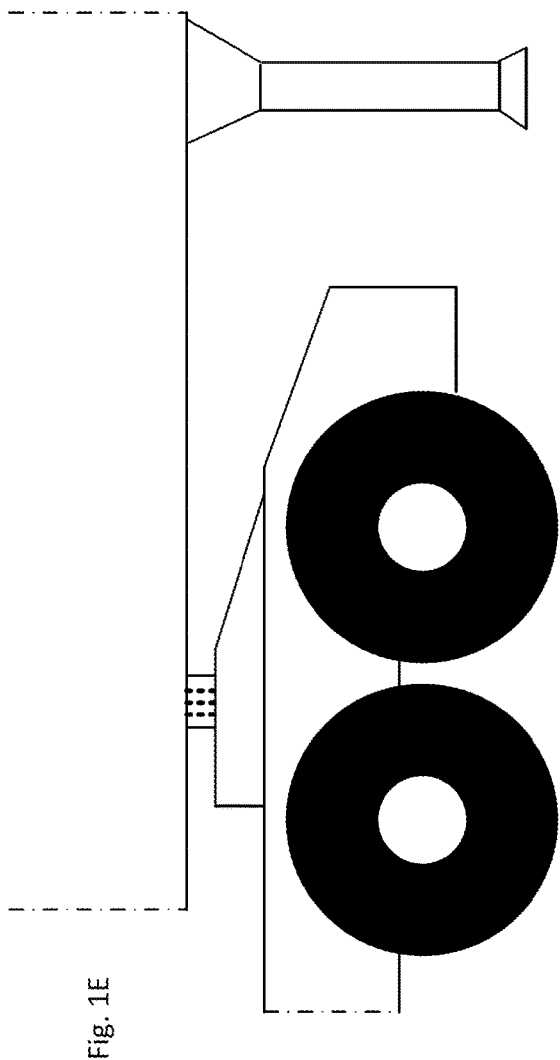
Fig. 1D
Fig. 1E

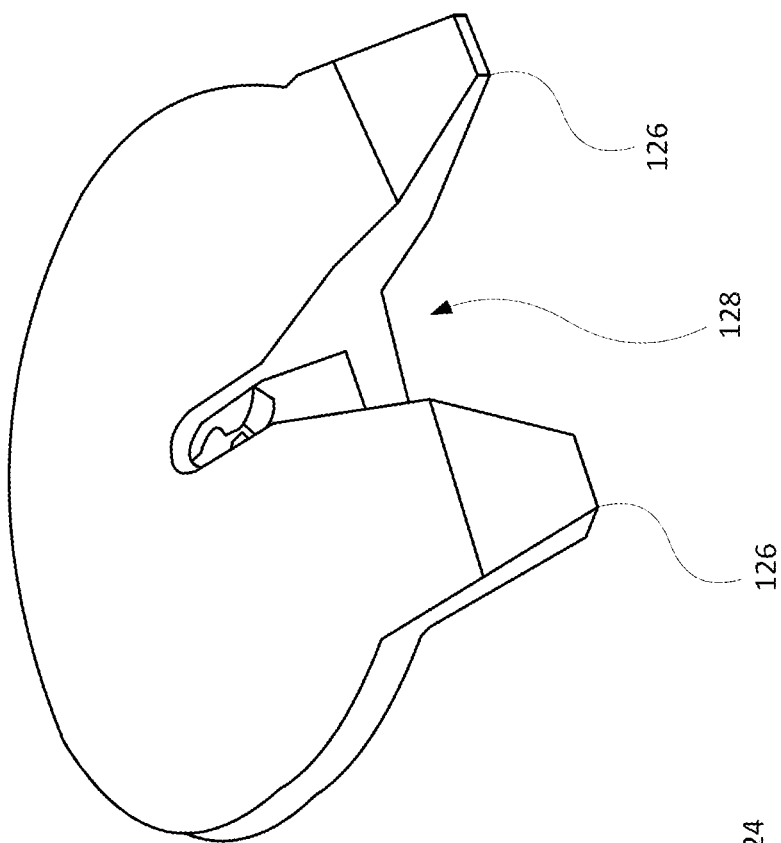
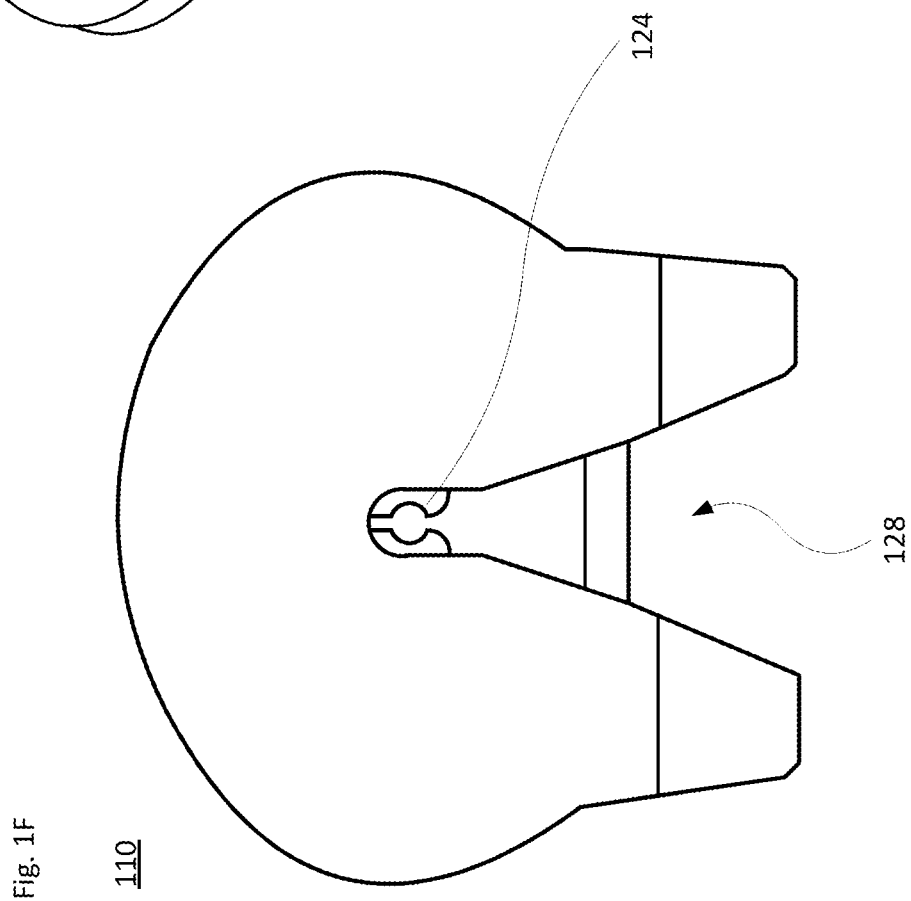

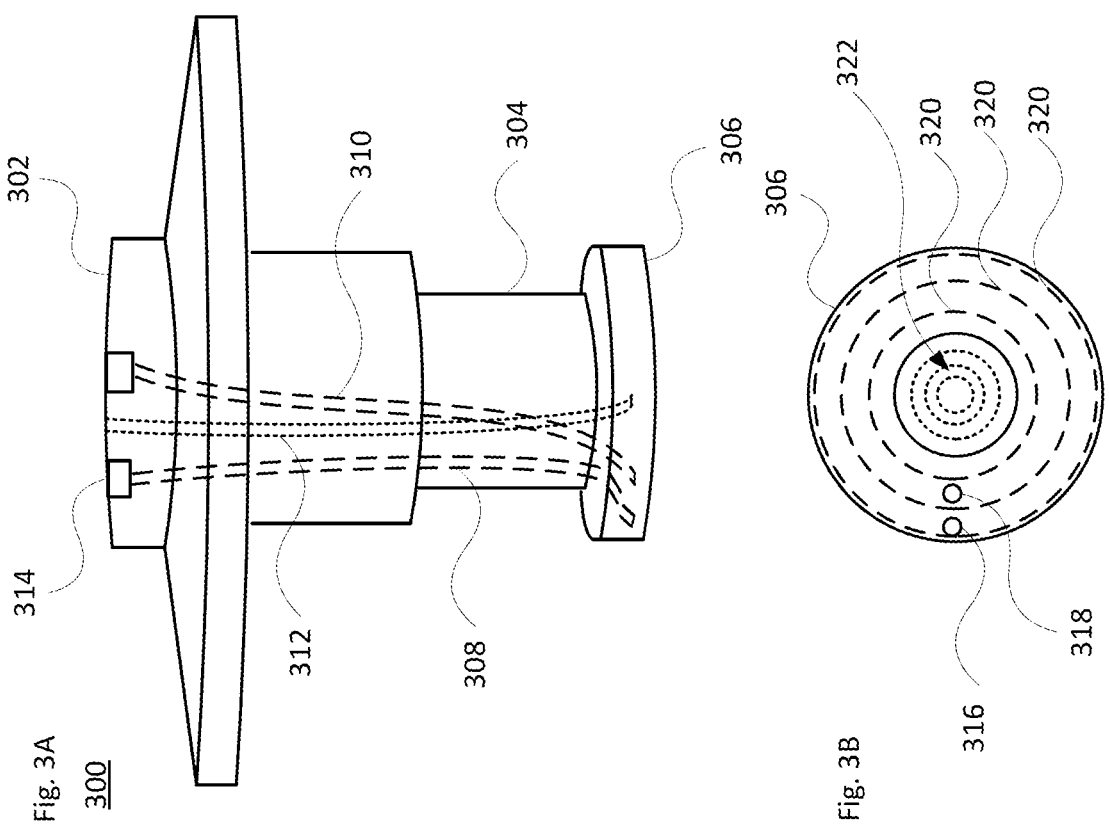

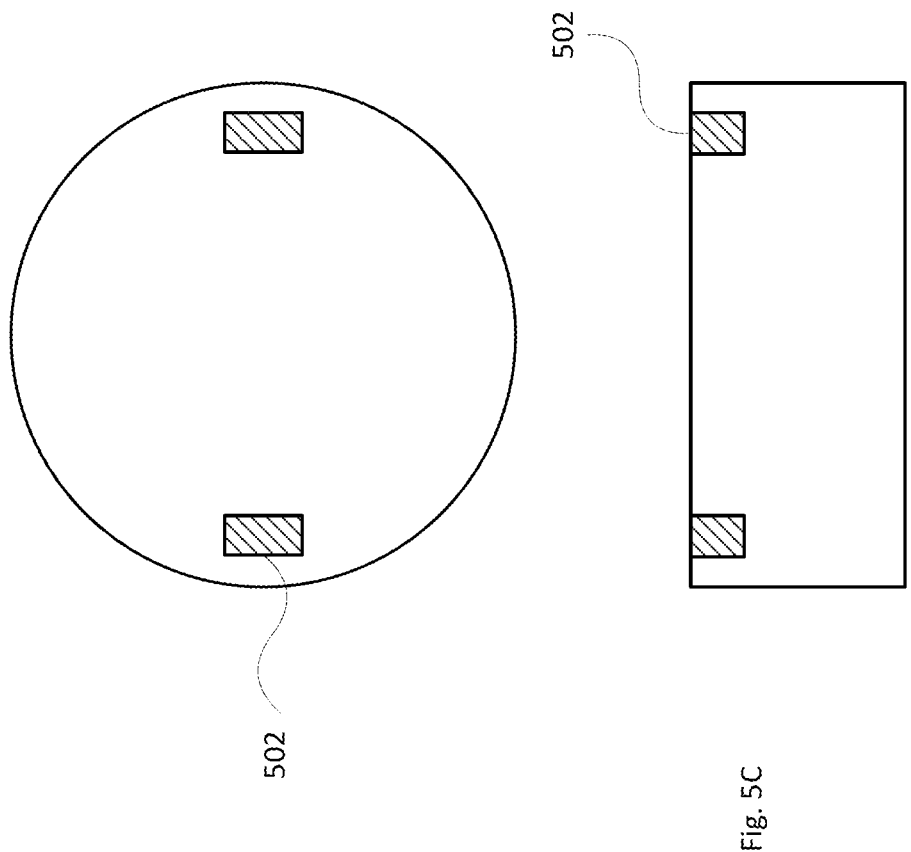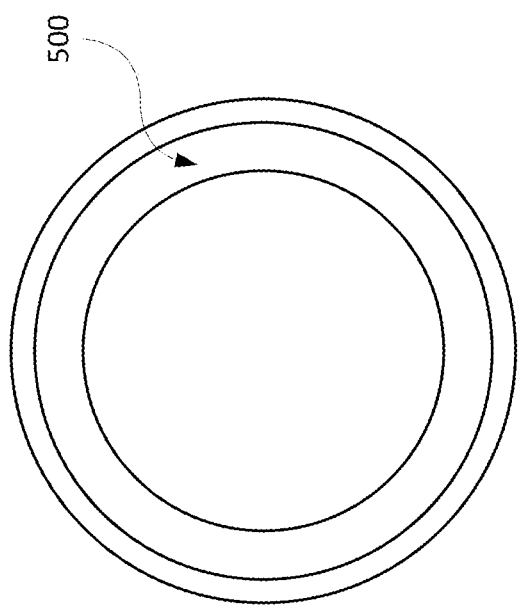

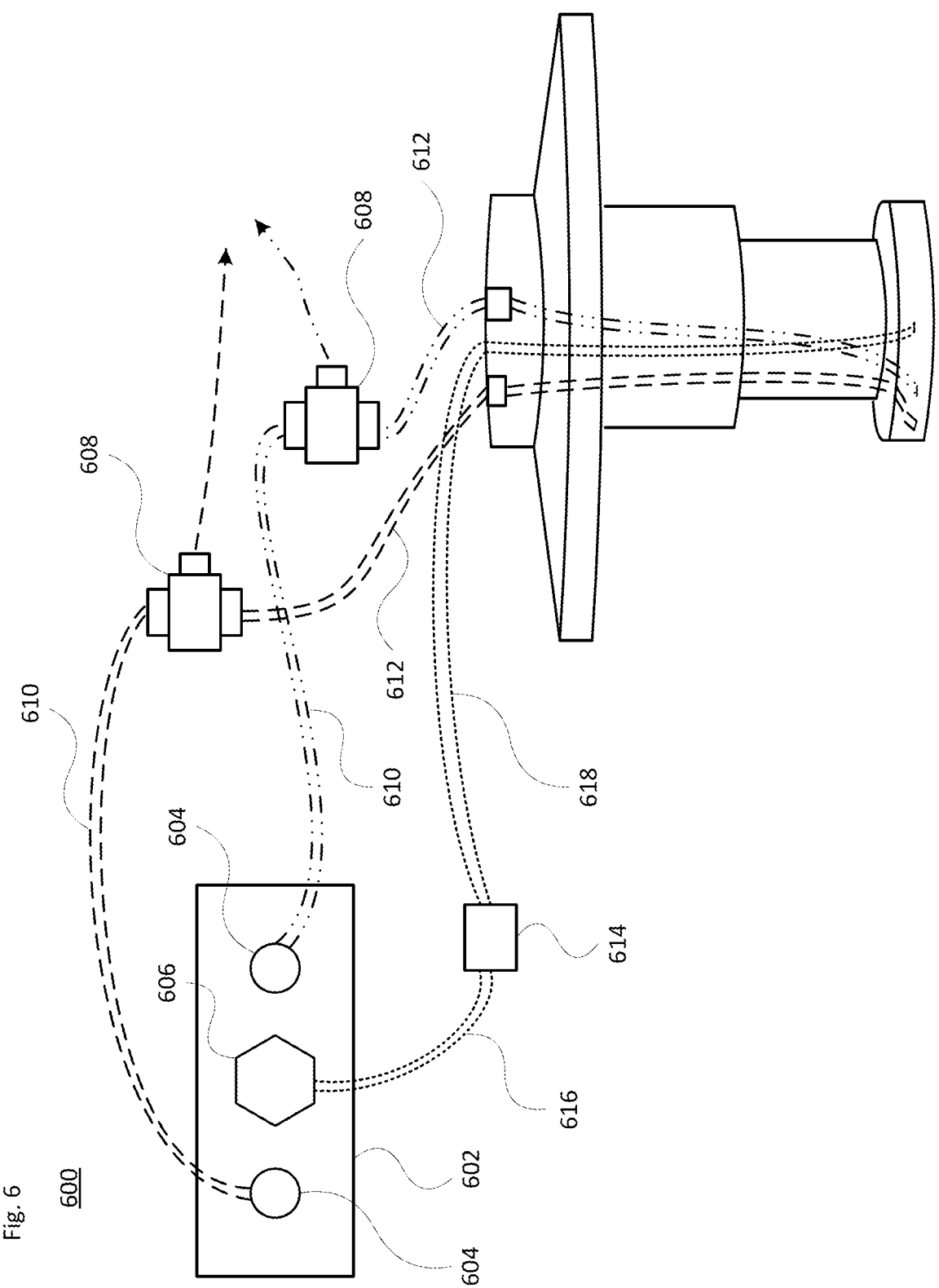

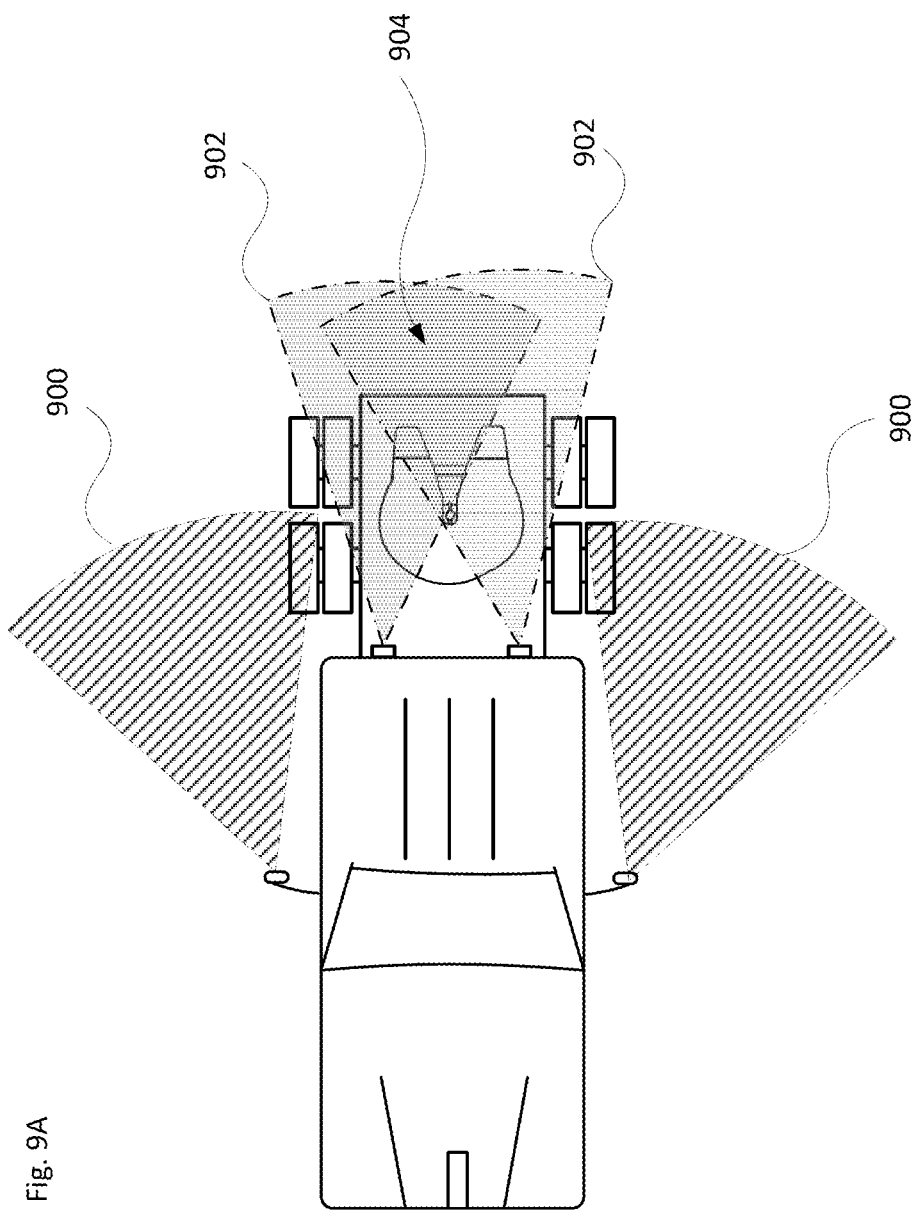

SYSTEMS AND METHODS FOR AUTOMATIC AIR AND ELECTRICAL CONNECTIONS ON AUTONOMOUS CARGO VEHICLES

CROSS REFERENCE TO RELATED APPLICATIONS

The present application is a continuation of U.S. patent application Ser. No. 16/007,688, filed Jun. 13, 2018, which is a continuation-in-part of U.S. patent application Ser. No. 15/992,337, filed May 30, 2018, now U.S. Pat. No. 10,807,660, the entire disclosures of which are incorporated herein by reference.

BACKGROUND

Autonomous vehicles, such as vehicles that do not require a human driver, can be used to aid in the transport of trailered (e.g., towed) cargo, such as freight, livestock or other items from one location to another. Such vehicles may operate in a fully autonomous mode without any in-vehicle passenger input or a partially autonomous mode where a person may provide some driving input. For conventional non-autonomous commercial tractor-trailer vehicles, the air supply that controls the trailer brakes and the electrical connector that controls lights and power automatic braking system units are connected and disconnected manually. Since such vehicles are driven manually, the driver typically performs the tasks of coupling and decoupling the air supply and electrical connectors between the tractor unit and the trailer.

However, this approach may not be feasible for large cargo vehicles that will operate in a partially or fully autonomous driving mode. In the former situation, the passenger in the cab of the tractor unit may not be appropriately trained to couple or decouple the trailer to the trailer unit. And in the latter situation, there may be no person present at either the cargo pickup location or the destination. Thus, the connection process, whether coupling or decoupling, may be a major barrier for large autonomous cargo vehicles. One solution would be to have a person on hand at both endpoint facilities, although this may be inefficient or simply not feasible in various situations.

BRIEF SUMMARY

The technology described herein provides systems and methods for autonomously coupling and decoupling the air supply and electrical connections between the vehicle cab and the cargo trailer. Aspects of the technology include fifth-wheel and kingpin configurations to provide these connections. Methods of coupling and decoupling using various sensors and automated landing gear are also disclosed.

According to aspects of the disclosure, a vehicle is configured to operate in an autonomous driving mode. The vehicle comprises a tractor unit that includes a driving system configured to perform driving operations in the autonomous driving mode, a perception system including one or more sensors configured to detect objects in an environment surrounding the vehicle, and a fifth-wheel configured to detachably couple to a kingpin of a trailer. The fifth-wheel includes a clamp mechanism and a connection surface. The clamp mechanism is arranged to secure to a clamp section of the kingpin. The connection surface includes a pneumatic connection section and an electrical connection section. The pneumatic connection section includes one or more slots arranged along the connection surface to align with one or more holes on a contact surface of the kingpin. The one or more slots are configured to provide air pressure to a braking system of the trailer. The electrical connection section includes a set of electrical contacts configured for operative communication with an electrical contact interface of the kingpin. The tractor unit also includes a control system that is operatively coupled to the driving system, the perception system and the fifth-wheel. The control system has one or more computer processors configured to receive data from the perception system, to direct the driving system when operating in the autonomous driving mode based on the data received from the perception system, and to control communication with the trailer via the set of electrical contacts of the fifth-wheel.

In one example, the one or more slots are concentric circular slots arranged along the connection surface. In another example, the one or more slots are arcuate slots arranged along the connection surface.

The pneumatic connection section of the fifth-wheel may further include one or more internal pneumatic conduits respectively coupled at a first end to the one or more slots and at a second end to an air supply of the vehicle, as well as an electrical harness coupled at a first end thereof to the electrical contacts of the electrical connection section. The electrical harness is operatively connected via a second end thereof to the control system.

In another example, the electrical connection section is further configured to supply power to the trailer.

The fifth-wheel may further include one or more read heads configured to obtain rotational information from a magnetic encoder ring of the kingpin and to provide the obtained rotational information to the control system in order to determine a relative alignment of the trailer to the tractor unit. Here, the electrical connection section may be arranged centrally along the connection surface of the fifth-wheel, the one or more slots may be arranged at least partially around the connection section, and the one or more read heads may be disposed either (i) between the one or more slots and the electrical connection section, or (ii) external to the one or more slots along the connection surface. The one or more read heads may comprise a pair of read heads. In this case, each read head may separately coupled to a power system of the vehicle and having a different communication link to the control system, for example for redundancy.

The one or more sensors of the perception system may include at least one sensor positioned on the tractor unit to identify a relative position of the trailer to the tractor unit so that the fifth-wheel can be aligned to capture the kingpin.

And in a further example, the vehicle includes the trailer, and the fifth-wheel is coupled to the kingpin of the trailer.

According to other aspects of the technology, a trailer is configured to operate with a tractor unit in an autonomous driving mode. The trailer comprises a cargo unit having a support platform, a plurality of wheels coupled to the support platform, a braking system operatively attached to one or more of the plurality of wheels, an electronic control unit comprising one or more processors, and a kingpin. The kingpin has a first end attached to the support platform, a second end remote from the first end, and a clamp section disposed between the first end and the second end. The clamp section is configured for pivotal connection to a clamp mechanism of a fifth-wheel of the tractor unit. The kingpin includes one or more air conduits and an electrical conduit disposed therein. The first end of the kingpin includes one or more connectors respectively coupled to the one or more air conduits and an electrical connector coupled to the electrical conduit. The second end of the kingpin includes one or more openings corresponding to the air conduits, the one or more openings being arranged to receive air pressure from the tractor unit and supply the air pressure to the braking system via the air conduits. The second end of the kingpin further includes an electrical contact interface configured for operative communication with an electrical connection section of the fifth-wheel to provide signals to the electronic control unit via the electrical conduit for operation in the autonomous driving mode.

In one example, the second end of the kingpin includes a set of O-rings disposed on either side of the one or more openings. The set of O-rings is configured to prevent air leakage when the kingpin is coupled to the fifth-wheel. In another example, the electrical contact interface of the second end of the kingpin comprises one or more slip-ring electrical connections coupled to the electrical conduit. Here, the one or more slip-ring electrical connections include a set of contact patches. The set of contact patches are arranged to line up with electrical contacts on the fifth-wheel.

The electrical contact interface may be further configured to receive power from the electrical connection section of the fifth-wheel and to supply the power to the electronic control unit of the trailer.

The second end of the kingpin may further include a magnetic encoder ring arranged to provide rotational information of the kingpin to one or more read heads disposed at the fifth-wheel of the tractor unit. In this case, the electrical contact interface may be arranged centrally along the second end of the kingpin, the one or more openings may be arranged closer to an outer edge of the second end than the electrical contact interface, and the magnetic encoder ring may be disposed either (i) between the electrical contact interface and the one or more openings, or (ii) closer to the outer edge of the second end than the one or more openings. The magnetic encoder ring may include a set of unique marks or distance coded reference marks to indicate the rotational information.

The trailer may further comprise a connection section including one or more air connections and an electrical connection. The connection section is configured to provide backward compatibility with a tractor unit not capable of operating in an autonomous driving mode. The trailer may further include one or more check valves. In this case, each check valve has a first link to a respective one of the one or more air connections of the connection section, a second link to a respective one of the one or more air conduits of the kingpin, and a third link to the braking system. Here, the electronic control unit is operatively coupled to the electrical connection of the connection section.

BRIEF DESCRIPTION OF THE DRAWINGS

FIGS. 1A-B illustrate an example tractor-trailer arrangement.

FIGS. 1D-E illustrate tractor-trailer connection arrangements according to aspects of the disclosure.

FIGS. 1F-G illustrate an example fifth-wheel according to aspects of the disclosure.

FIGS. 3A-B illustrate an example trailer kingpin in accordance with aspects of the disclosure.

FIGS. 5A-C illustrate a contactless angle sensor arrangement in accordance with aspects of the disclosure.

FIG. 6 illustrates a backward-compatible trailer hookup arrangement in accordance with aspects of the disclosure.

FIGS. 9A-B illustrate examples of rear sensor coverage in accordance with aspects of the disclosure.

DETAILED DESCRIPTION

Overview

Figure 1C:
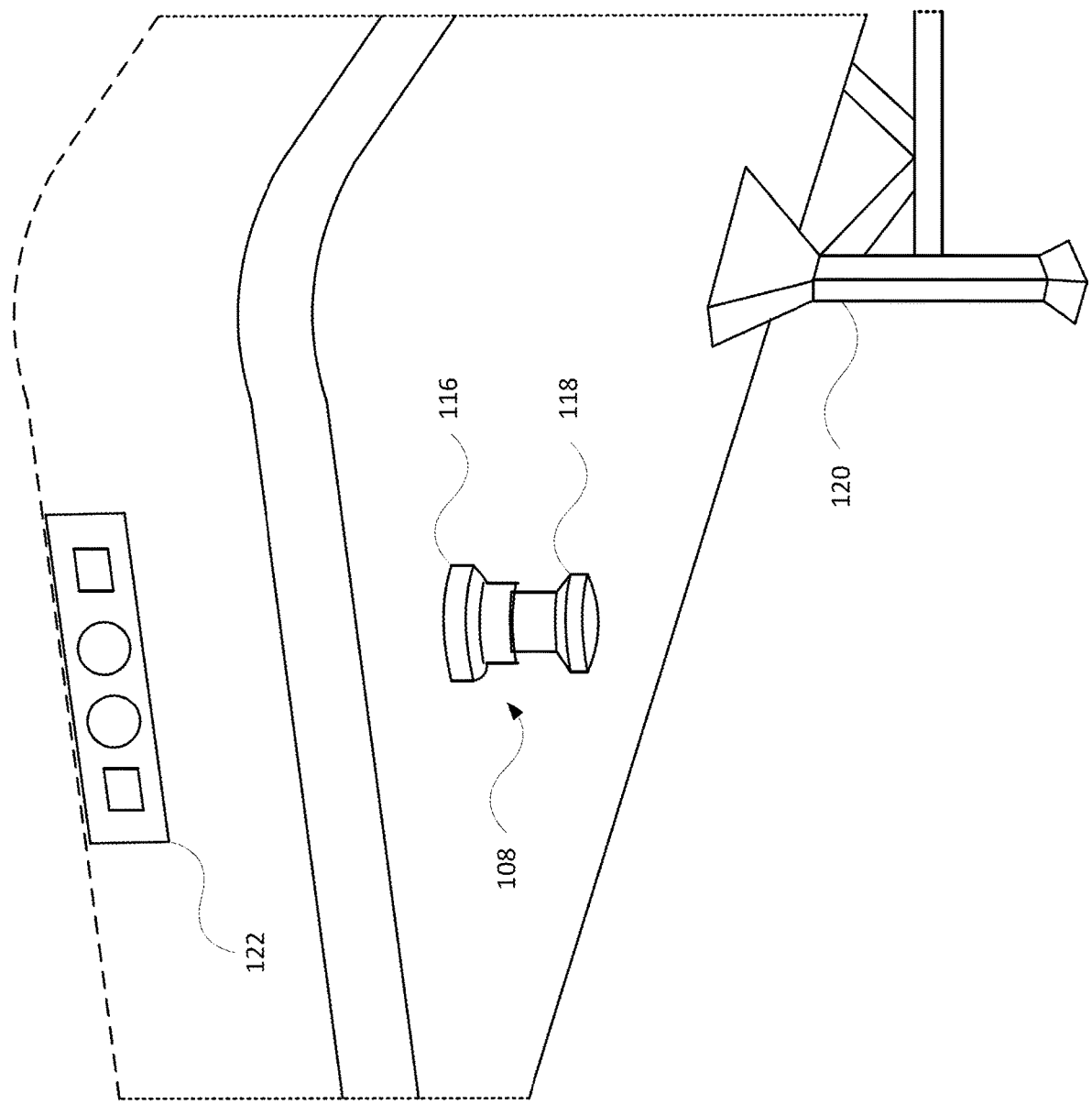
FIG. 1C illustrates a portion of a trailer of the tractor-trailer arrangement of FIGS. 1A-B.

The technology relates to fully autonomous or semi-autonomous vehicles for transporting cargo, such as freight or livestock, between selected locations. The cargo may be transported using a towed or trailered arrangement. Driving from a warehouse or other point of origin to the destination is done in a fully or partially autonomous mode. Whether the cargo unit (trailer) can be autonomously coupled and decoupled with a tractor unit may significantly impact how efficient the overall transportation process will be.

FIGS. 1A-B illustrate an example vehicle 100, such as a tractor-trailer truck. The truck may include, e.g., a single, double or triple trailer, or may be another medium or heavy duty truck such as in commercial weight classes 4 through 8. As shown, the truck includes a tractor unit 102 and a single cargo unit or trailer 104. The trailer 104 may be fully enclosed, open such as a flat bed, or partially open depending on the type of cargo to be transported. The tractor unit 102 includes the engine and steering systems (not shown) and a cab 106 for a driver and any passengers. In a fully autonomous arrangement, the cab 106 may not be equipped with seats or manual driving components, since no person may be necessary.

The trailer 104 includes a hitching point, known as a kingpin, 108. The kingpin 108 is typically formed as a solid steel shaft, which is configured to pivotally attach to the tractor unit 102. In particular, the kingpin 108 attaches to a trailer coupling 110, known as a fifth-wheel, that is mounted rearward of the cab. For a double or triple tractor-trailer, the second and/or third trailers may have simple hitch connections to the leading trailer. Or, alternatively, according to one aspect of the disclosure, each trailer may have its own kingpin. In this case, at least the first and second trailers could include a fifth-wheel type structure arranged to couple to the next trailer.

As shown, connectors 112 and 114 also couple from the tractor unit 102 to the trailer 104. These may include one or more air hoses 112 and one or more electrical conduits 114. The air hose(s) 112 enable the tractor unit 102 to operate the pneumatic brakes of the trailer 104, and the electrical conduit(s) 114 provide power and signals to the brakes and lights of the trailer 104. In an autonomous system, it may be difficult or unfeasible to manually connect the air hoses, electrical conduits and other connectors between the tractor unit 102 and trailer 104.

FIG. 1C is a partial view of trailer 104, and illustrates an example kingpin 108. As shown, the kingpin 108 has a first end 116 that is secured to a bottom of the trailer structure. A second end 118 of the kingpin 108 is configured to pivotally couple to the fifth-wheel 110, (see FIGS. 1D and 1E). The trailer structure also includes landing gear 120. While only one landing gear element is shown, two (or more) landing gear may be employed. When the trailer 104 is connected to the tractor unit 102, the landing gear 120 are retracted so that they do not interfere with driving, as shown in FIG. 1D. When the trailer 104 is to be disengaged from the tractor unit 102, the landing gear 120 are extended to contact the ground and support the trailer structure, as shown in FIG. 1E.

Also shown in FIG. 1C is a connection section 122, which receives the air hoses 112, electrical conduit(s) 114 and any other connectors from the tractor unit 102. In order to overcome issues involved with such manual connections, a new approach has been designed that helps achieve full end-to-end autonomous operation while providing secure, reliable and backward compatible connectivity. This approach is discussed further below.

FIGS. 1F and 1G illustrate an example of fifth-wheel 110 in accordance with aspects of the technology. As shown, the fifth-wheel includes a clamp mechanism 124 that may comprise a pair of adjustable locking elements. A pair of angled ramps 126 and a channel 128 formed between the ramps allow the kingpin 108 to be guided towards the clamp mechanism 124. Once the kingpin 108 is received by the clamp mechanism 124, the kingpin 108 is secured but permitted to pivotally rotate, which allows for the tractor unit 102 to turn at an angle relative to the trailer 104.

In a transportation arrangement where the tractor unit is capable of driving in a fully autonomous or semi-autonomous mode, there may be no driver or other person available to hook up the trailer to the tractor unit at a pickup location or to disconnect them at the destination. For instance, how would the air hoses 112 and the electrical conduits 114 be connected to the connection section 122? Aspects of the technology overcome these and other issues by omitting external air hoses, electrical conduits and other connections made between a back of the cab and the front of the trailer. Instead, the necessary connections are made internally through the fifth-wheel and the kingpin. This approach and other features are detailed below.

EXAMPLE SYSTEMS

Figure 2A:
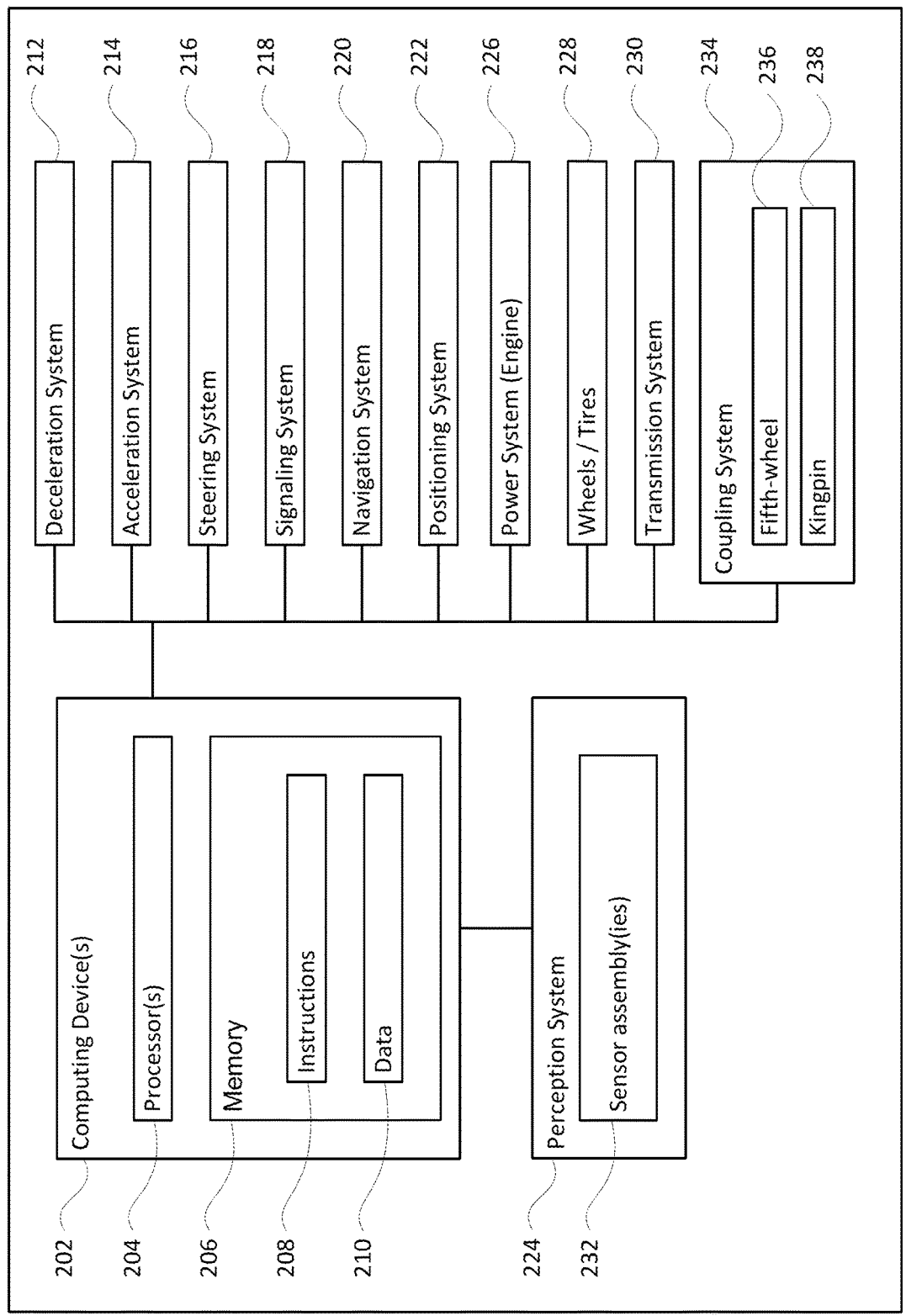
FIG. 2A illustrates a system diagram of an autonomous vehicle control system in accordance with aspects of the disclosure.

FIG. 2A illustrates a block diagram 200 with various components and systems of a vehicle, such as a truck, farm equipment or construction equipment, configured to operate in a fully or semi-autonomous mode of operation. By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

As shown in the block diagram of FIG. 2A, the vehicle includes a control system of one or more computing devices, such as computing devices 202 containing one or more processors 204, memory 206 and other components typically present in general purpose computing devices. The control system may constitute an electronic control unit (ECU) of a tractor unit. The memory 206 stores information accessible by the one or more processors 204, including instructions 208 and data 210 that may be executed or otherwise used by the processor 204. The memory 206 may be of any type capable of storing information accessible by the processor, including a computing device-readable medium. The memory is a non-transitory medium such as a hard-drive, memory card, optical disk, solid-state, tape memory, or the like. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. As an example, data 210 of memory 206 may store information, such as calibration information, to be used when calibrating different types of sensors.

The one or more processor 204 may be any conventional processors, such as commercially available CPUs. Alternatively, the one or more processors may be a dedicated device such as an ASIC or other hardware-based processor. Although FIG. 2A functionally illustrates the processor(s), memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may capable of communicating with various components of the vehicle. For example, returning to FIG. 2A, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle).

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of vehicle 100 in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other transmission system 230 that includes various components between an engine of the vehicle and the wheels of the vehicle. Again, by controlling these systems, computing devices 202 may also control the transmission system 230 of the vehicle in order to maneuver the vehicle autonomously.

As an example, computing devices 202 may interact with deceleration system 212 and acceleration system 214 in order to control the speed of the vehicle. Similarly, steering system 216 may be used by computing devices 202 in order to control the direction of vehicle. For example, if the vehicle is configured for use on a road, such as a tractor-trailer truck or a construction vehicle, the steering system 216 may include components to control the angle of wheels of the tractor unit 102 to turn the vehicle. Signaling system 218 may be used by computing devices 202 in order to signal the vehicle's intent to other drivers or vehicles, for example, by lighting turn signals or brake lights when needed.

Navigation system 220 may be used by computing devices 202 in order to determine and follow a route to a location. In this regard, the navigation system 220 and/or data 210 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 224 also includes one or more components for detecting objects external to the vehicle such as other vehicles, obstacles in the roadway, traffic signals, signs, trees, etc. For example, the perception system 224 may include one or more light detection and ranging (Lidar) sensors, sonar devices, radar units, cameras, inertial sensors (e.g., gyroscopes or accelerometers), and/or any other detection devices that record data which may be processed by computing devices 202. The sensors of the perception system 224 may detect objects and their characteristics such as location, orientation, size, shape, type (for instance, vehicle, pedestrian, bicyclist, etc.), heading, and speed of movement, etc. The raw data from the sensors and/or the aforementioned characteristics can sent for further processing to the computing devices 202 periodically and continuously as it is generated by the perception system 224. Computing devices 202 may use the positioning system 222 to determine the vehicle's location and perception system 224 to detect and respond to objects when needed to reach the location safely. In addition, the computing devices 202 may perform calibration of individual sensors, all sensors in a particular sensor assembly, or between sensors in different sensor assemblies.

As indicated in FIG. 2A, the perception system 224 includes one or more sensor assemblies 232. In one example, the sensor assemblies 232 may be arranged as sensor towers integrated into the side-view mirrors on the truck, farm equipment, construction equipment or the like. Sensor assemblies 232 may also be positioned at different locations on the tractor unit 102 or on the trailer 104. The computing devices 202 may communicate with the sensor assemblies located on both the tractor unit 102 and the trailer 104. Each assembly may have one or more types of sensors such as those described above.

Also shown in FIG. 2A is a coupling system 234 for connectivity between the tractor unit and the trailer. The coupling system 234 includes a fifth-wheel 236 at the tractor unit and a kingpin 238 at the trailer. These elements and the coupling system 234 are discussed in detail below. Most or all of the components and subsystems of FIG. 2A may be part of or controlled by the tractor unit, except for the kingpin 238 of the trailer.

Figure 2B:
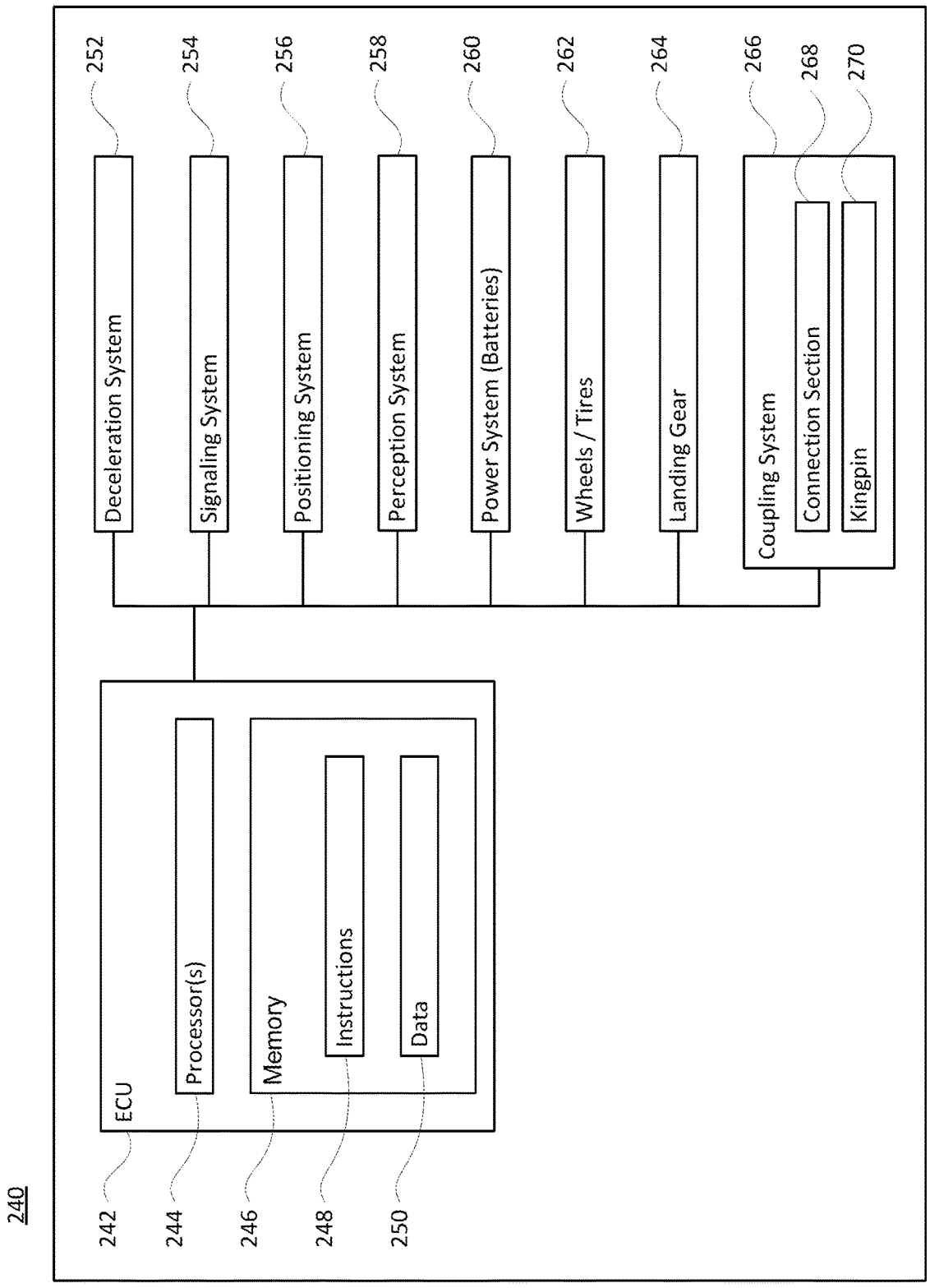
FIG. 2B illustrates a system diagram of a trailer, in accordance with aspects of the disclosure.

FIG. 2B illustrates an example block diagram 240 of the trailer. As shown, the system includes an ECU 242 of one or more computing devices, such as computing devices containing one or more processors 244, memory 246 and other components typically present in general purpose computing devices. The memory 246 stores information accessible by the one or more processors 244, including instructions 248 and data 250 that may be executed or otherwise used by the processor(s) 244. The descriptions of the processors, memory, instructions and data from FIG. 2A apply to these elements of FIG. 2B.

The ECU 242 is configured to receive information and control signals from the trailer unit. The on-board processors 244 of the ECU 242 may communicate with various systems of the trailer, including a deceleration system 252 (for controlling braking of the trailer), signaling system 254 (for controlling turn signals), and a positioning system 256 (for determining the position of the trailer). The ECU 242 may also be operatively coupled to a perception system 258 (for detecting objects in the trailer's environment) and a power system 260 (for example, a battery power supply) to provide power to local components. Some or all of the wheels/tires 262 of the trailer may be coupled to the deceleration system 252, and the processors 244 may be able to receive information about tire pressure, balance, wheel speed and other factors that may impact driving in an autonomous mode, and to relay that information to the processing system of the tractor unit. The deceleration system 252, signaling system 254, positioning system 256, perception system 258, power system 260 and wheels/tires 262 may operate in a manner such as described above with regard to FIG. 2A.

The trailer also includes a set of landing gear 264, as well as a coupling system 266. The landing gear provide a support structure for the trailer when decoupled from the tractor unit. The coupling system 266, which may be a part of coupling system 234, provides connectivity between the trailer and the tractor unit. The coupling system 266 may include a connection section 268 to provide backward compatibility with legacy trailer units that may or may not be capable of operating in an autonomous mode. The coupling system includes a kingpin 270 configured for enhanced connectivity with the fifth-wheel of an autonomous-capable tractor unit. These elements are discussed in detail below.

EXAMPLE IMPLEMENTATIONS

In view of the structures and configurations described above and illustrated in the figures, various implementations will now be described.

Backward compatible with existing kingpins and trailers, the coupling system 234 provides the necessary pneumatic, power, communication, and other connections between the tractor unit and the trailer of the vehicle. As noted above, such connections can be made internally through the fifth-wheel 236 of the tractor unit and the kingpin 238 of the trailer. For instance, this may be accomplished via one or more connection conduits. An example 300 of a kingpin having internal pneumatic and electrical connections is shown in FIGS. 3A and 3B. A first end 302 of the kingpin is attached to the underside of a trailer (not shown). A clamp section 304 is disposed between the first end 302 and a second end 306. The clamp section 304 is configured to be securely and rotatably grasped by the clamp mechanism of the fifth-wheel, such as clamp mechanism 124 shown in FIGS. 1F and 1G.

In the side view of FIG. 3A, air conduits 308 and 310, and electrical conduit 312 are illustrated in dashed lines, indicating that the conduits are received within the outer housing of the kingpin body. The air conduits provide air to a pneumatic braking system of the trailer. The air conduits may be formed by machining, casting, printing or otherwise forming channels within the kingpin between the first end 102 and the second end 104. Connectors 314, such as National Pipe Thread (NPT) taps, are arranged along the first end 102 to route air to the trailer's braking system. The electrical conduit 312 may provide power as well as control signal, data communication and other information to the ECU of the trailer.

Figure 4B:
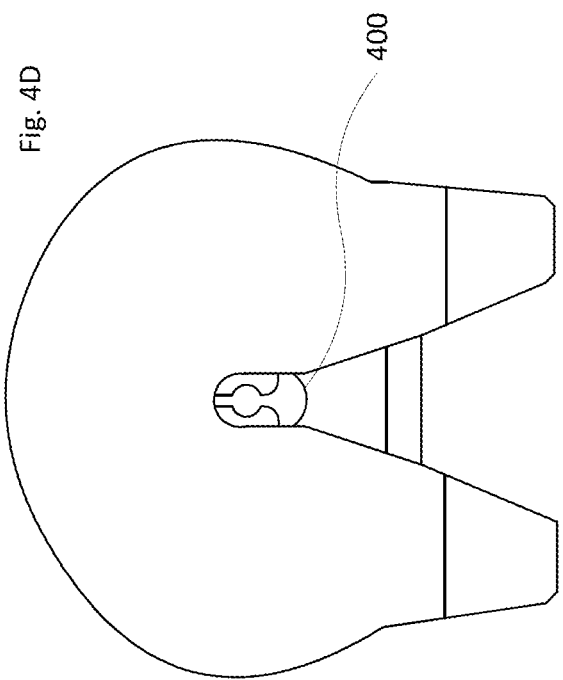
FIGS. 4A-D illustrate features of a tractor fifth-wheel, in accordance with aspects of the disclosure.

FIG. 3B is a bottom view of the kingpin, illustrating an outer surface of the second end 306. As shown, a pair of holes 316 and 318 is formed in the outer surface. These holes are at the ends of the air conduits 308 and 310, respectively. The holes 316 and 318 are configured to line up with pressurized air slots on the trailer side, which are shown in FIGS. 4A-C and are discussed below. A series of concentric O-rings 320, illustrated in dashed lines, allow for rotation of the kingpin relative to the fifth-wheel, while also enabling the pressurized air slots to transmit pressure to the holes 316 and 318 without leaking.

An electrical contact interface 322 is provided as well, for instance closer to the center of the outer surface of the second end 306 than the O-rings 320 and the holes 316 and 318. The electrical contact interface 322 may include one or more slip-ring electrical connections to couple with the electrical conduit 312. In one example, a set of annular or arcuate contact patches are disposed along the outer surface of the kingpin base. The patches are configured to line up with contact pins on the fifth-wheel (see FIGS. 4A-B), and allow for rotation of the kingpin relative to the fifth-wheel while maintaining an electrical connection. The electrical contact interface 322 may also supply power to the trailer. Other types of connections may be employed by the electrical contact interface 322, so long as communication is enabled with the ECU. For example, inductive coupling between the fifth-wheel and the kingpin may be employed for communication, and possibly power transfer as well.

Figure 4D:
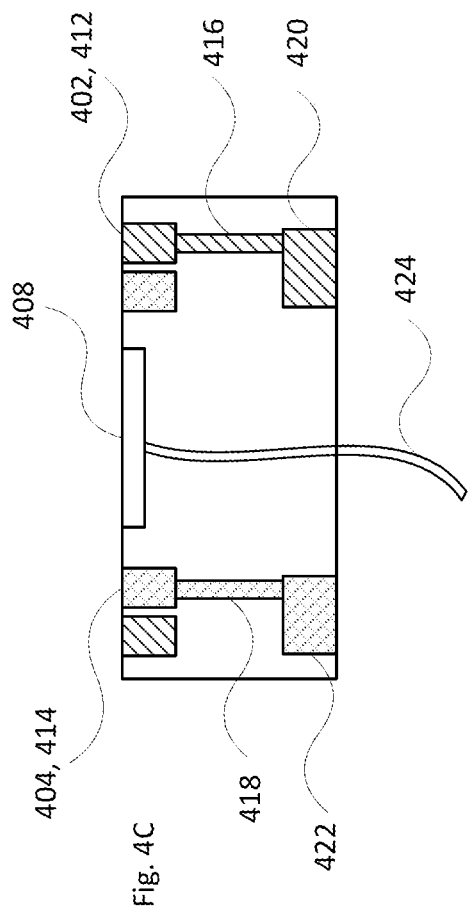
Figure 4A:
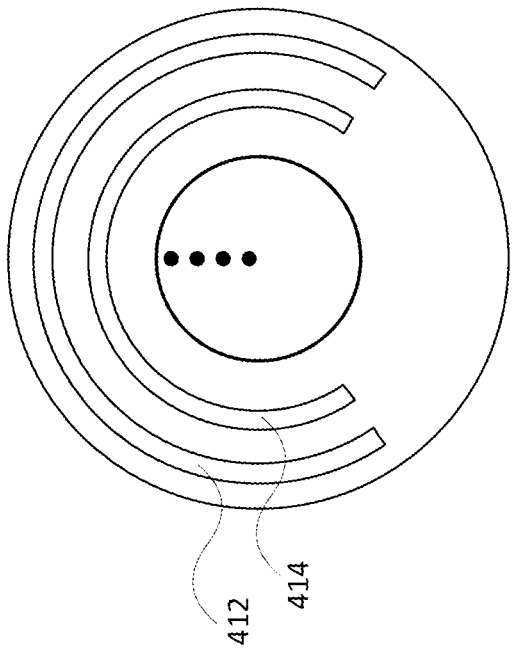
Figure 4C:
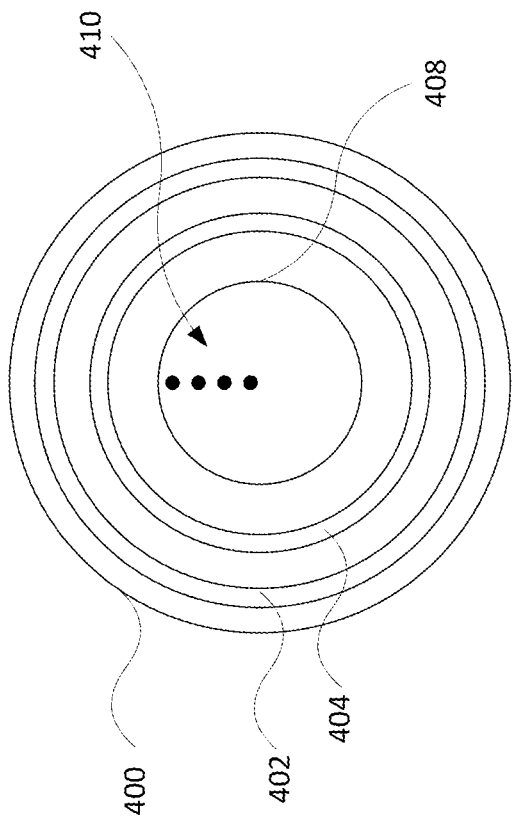

FIGS. 4A-D illustrate elements of a fifth-wheel that provide for counterpart connectivity to the kingpin of FIGS. 3A-B. FIG. 4D presents a top-down view of a fifth-wheel, including a connection section 400 is located beneath the clamp mechanism. The connection section 400 is arranged for operative communication with the second end of the kingpin. As shown in the examples of FIGS. 4A and 4B, the connection section 400 has a top surface, which is generally planar and circular, and has effectively the same diameter as the diameter of the second end of the kingpin.

When the kingpin is secured by the clamp mechanism, the top surface of the connection section and the outer surface of the second end of the kingpin physically contact. For instance, at least a portion of the fifth-wheel physically contacts the kingpin. As illustrated in FIG. 4A, the top surface of the connection section may include a pair of concentric annular slots 402 and 404. The slots 402 and 404 are spaced to line up with the holes 316 and 318 in the second end of the kingpin, so that they can provide air pressure to the trailer. As noted above, the O-rings on the second end of the kingpin prevent air leakage. Alternatively or in addition, O-rings may also be disposed on the fifth-wheel top surface.

Located centrally on the top surface is an electrical connection section 408. The electrical connection section 408 may include a set of electrical contacts 410. Or, alternatively, the electrical connection section 408 may provide communication, signaling and/or power via inductive coupling or some other technique. FIG. 4B illustrates an alternate variation where instead of annular slots, a pair of arcuate slots 412 and 414 is provided. In one scenario, arcuate slots may be employed instead of the annular slots because the kingpin and trailer are incapable of rotating 360° with respect to the tractor unit, and so the holes 316 and 318 on the bottom of the kingpin are limited to certain contact paths on the fifth-wheel. For instance, the range of rotation may be no more than 270°.

FIG. 4C illustrates a side cutaway view of the connection section 400. The cutaway view illustrates internal routing of air lines and an electrical harness. In particular, the slots 402 (or 412) and 404 (or (414) on the top surface couple to conduits 416 and 418. The conduits 416 and 418 connect to connectors 420 and 422, respectively, which may be NPT taps. The connectors 420 and 422 couple to the air supplies on the tractor. Similarly, electrical harness 424 connects to the electrical connection section 408 on one end and to the tractor unit ECU, which may include the computing devices and other subsystems of the tractor unit.

When a trailer is connected to a tractor unit, it will be very helpful for the tractor unit to know the current orientation and position of the trailer. In one scenario, this information may be obtained using sensors including Lidar, radar, cameras, sonar, etc., mounted on the tractor unit. However, adding additional sensors to obtain the information or expending processing time and resources to analyze the information from such sensors may be prohibitive. For example, there may be disadvantages in terms of cost, reliability and accuracy. Therefore, an alternative approach uses information provided directly from the kingpin and fifth-wheel themselves.

According to one aspect of the technology, a magnetic encoder system may be employed on the kingpin and fifth-wheel to provide information regarding the relative alignment between the tractor unit and the trailer. FIG. 5A illustrates a kingpin with a contactless magnetic encoder ring 500. The fifth-wheel, as shown in the top view of FIG. 5B and cutaway view of FIG. 5C, includes two (or more) read heads 502.

The read heads, which may be part of or operatively connected to the positioning system, obtain rotational information from magnetic signal measurements of the encoder ring. The encoder ring may include a set (e.g., a series) of unique marks or distance coded reference marks (DCRMs). The read heads are configured to detect the marks, which are used to determine the relative rotation between the kingpin and the fifth-wheel. While a single read head may be used, the additional read head(s) is included for redundancy. For instance, each read head may be powered separately and have a different communication link with the positioning system (222 of FIG. 2A) or other elements of the tractor unit's processing system.

The magnetic encoder ring as shown is an axial ring of a ferrous material applied to or embedded in the second end of the kingpin. In one example, the axial ring is slightly recessed (e.g., 1-5 mm recessed) relative to the exterior surface of the second end of the kingpin, to prevent wear during contact with the fifth-wheel. In another example, the axial ring is flush with the exterior surface. Here, the complementary section of the fifth-wheel may be slightly recessed (e.g., 1-5 mm recessed) to prevent wear.

The read head(s) are positioned within or on a surface of the fifth-wheel. The read heads and encoder ring may be positioned so as to not interfere with the air and electrical connections between the fifth-wheel and the kingpin. In one example, the encoder ring is disposed closer to the outer edge of the second end of the kingpin than the air holes 316 and 318 of FIG. 3B. In another example, the encoder ring is positioned between the air holes and the electrical contact interface 322 of FIG. 3B. In a further example, the encoder ring is included as part of the electrical contact interface 322. However, it may be more desirable for the encoder ring to be as large as possible, so as to give the greatest angular accuracy. The diameter of a conventional kingpin is 2 inches (50.8 mm). Thus, in the first example, the diameter of the outer edge of the encoder ring may be between 40-48 mm, and the angular accuracy may be between 0.75° and 1.1°. In another scenario, the encoder ring is arranged to provide an angular accuracy of less than 2.0°.

The magnetic encoder ring may be, e.g., a vulcanized elastoferrite or other polymer. In one example, a hydrogenated nitrile butadiene rubber (HNBR) and ferrite composite can be used. Alternatively, other materials such as magnetic ceramics, which may comprise strontium carbonate and iron oxide, may be employed. Still other ferrous materials can be employed, so long as the read heads are able to pick up and measure the necessary rotational information. Also, one or more additional encoder rings of varying diameters may be disposed on the second end of the kingpin. The additional encoder ring(s) may provide redundancy. They may also provide for enhanced accuracy of the rotational position measurements, especially if there is some non-planar motion of the kingpin relative to the fifth-wheel during driving, such as pitch or roll.

The fifth-wheel on the autonomous mode-capable tractor unit is designed to work with both new and legacy trailers. Thus, for a new trailer with a kingpin having internal air and electrical connections, the system would be arranged as discussed above and the tractor would provide pneumatic pressure, data and other signals, and/or power to the trailer. However, for a legacy trailer with a conventional kingpin, the fifth-wheel would obviously not be able to supply air, electrical signals or power, but would still seamlessly connect to the kingpin. In this case, air hoses and electrical conduits would need to be coupled to the connection section on the trailer, such as connection section 122 of FIG. 1C.

Similarly, the new kingpin arrangement is also backward compatible with conventional fifth-wheel devices. Here, if an autonomous-mode capable trailer were coupled to a conventional tractor unit, the air hoses and electrical conduits of the tractor unit would be coupled to a backward compatible connection section on the trailer. FIG. 6 illustrates an example 600 of such an arrangement. As shown, the arrangement includes a connection section 602, which may be equivalent to the connection section 122 shown in FIG. 1C. The connection section 602 may be arranged on a front side of the trailer facing the rear of the cab of the tractor unit. The connection section is configured to receive, for example, compressed air via air connections 604, and power, control signals, data communication and other information via electrical connection 606.

The air connections 604 may separately couple to check valves 608 via air lines 610. The check valves 608 have separate air lines 612, which couple to connectors on the kingpin, such as connectors 314 of FIG. 3A. Each check valve 608 may be an "or" type check valve, which can be used to combine the two air signals coming from one or both of the air connections 604 and the connectors on the kingpin. If air pressure is present in either line, the "or" valve provides the pressure to the braking system of the trailer. In one example, the check valves are double check valves, where the higher of two sources of pressure provides the pressure to the braking system.

The electrical connection 606 is coupled to trailer ECU 614, for instance via communication cable 616. The ECU 614 is also coupled to the electrical conduit of the kingpin, such as electrical conduit 312 of FIG. 3A, for instance by communication cable 618. The ECU determines whether information is being provided via either the electrical connection 606 or the electrical conduit of the kingpin, and can then act on the received information accordingly. While the ECU may be wired to the electrical connection 606 and/or the kingpin, in an alternative wireless links may be employed. For instance, these links may operate in the RF band, using a Bluetooth®, near field communication (NFC) or other communication arrangement.

Communication between a tractor unit and a trailer using the aforementioned electrical connections can employ different protocols. For instance, a protocol using the Controller Area Network (CAN) bus architecture, or an Ethernet-based technology such as BroadR-Reach®, may be employed between ECUs on the tractor unit and the trailer. Alternatively, other signaling approaches may also be used. By way of example only, data such as the trailer ID, trailer status, wheel speeds, location, service intervals, tire or brake pressure, inertial data, etc., may be transmitted to the tractor unit from the trailer. In addition, environmental information from sensors locally mounted on the trailer may also be provided to the tractor unit. This may include Lidar, radar, sonar, imaging and other sensor information. The imaging information may come from one or more cameras capable of visual, infrared, and/or night-vision operation. Cargo-specific information, such as the type(s) of cargo, weight, size, footprint and loading or stacking arrangement, whether it is perishable, subject to security, hazard or other safety protocols, etc., is also capable of being communicated via the CAN bus architecture or other communication arrangement.

In one scenario, the information from one or more different kinds of sensors may be employed so that the tractor-trailer system may operate in an autonomous mode. Each sensor may have a different range, resolution and/or field of view (FOV).

For instance, the sensors may include a long range, narrow FOV Lidar and a short range, tall FOV Lidar. In one example, the long range Lidar may have a range exceeding 50-250 meters, while the short range Lidar has a range no greater than 1-50 meters. Alternatively, the short range Lidar may generally cover up to 10-15 meters from the vehicle while the long range Lidar may cover a range exceeding 100 meters. In another example, the long range is between 10-200 meters, while the short range has a range of 0-20 meters. In a further example, the long range exceeds 80 meters while the short range is below 50 meters. Intermediate ranges of between, e.g., 10-100 meters can be covered by one or both of the long range and short range Lidars, or by a medium range Lidar that may also be included in the sensor system. The medium range Lidar may be disposed between the long and short range Lidars in a single housing. In addition to or in place of these Lidars, a set of cameras may be arranged, for instance to provide forward, side and rear-facing imagery. Similarly, a set of radar sensors may also be arranged to provide forward, side and rear-facing data. Other sensors may include an inertial sensor, a gyroscope, an accelerometer, etc.

Figure 7A:
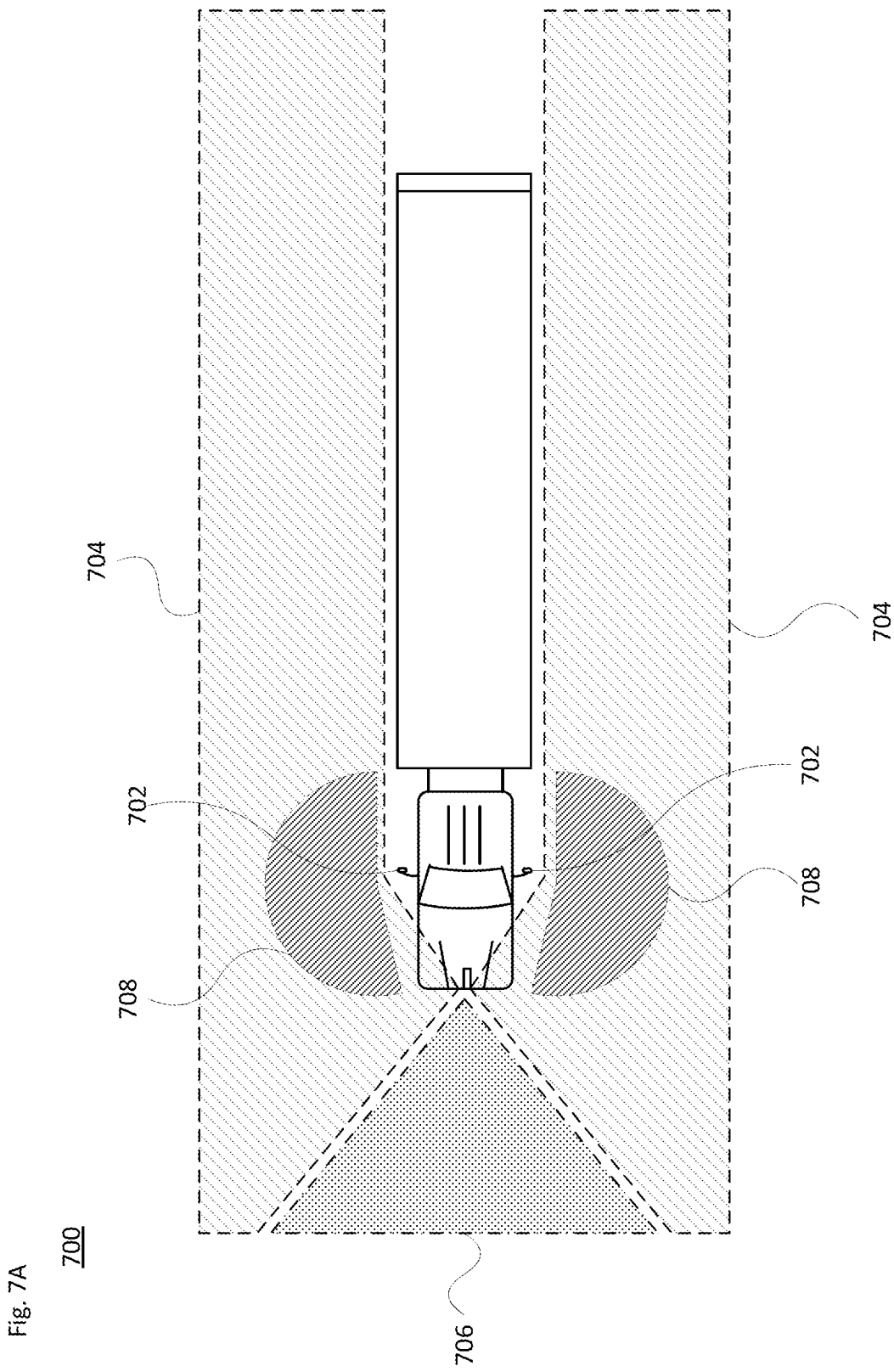
FIG. 7A is an example of short and long range Lidar coverage for a tractor-trailer vehicle in accordance with aspects of the disclosure.
Figure 7B:
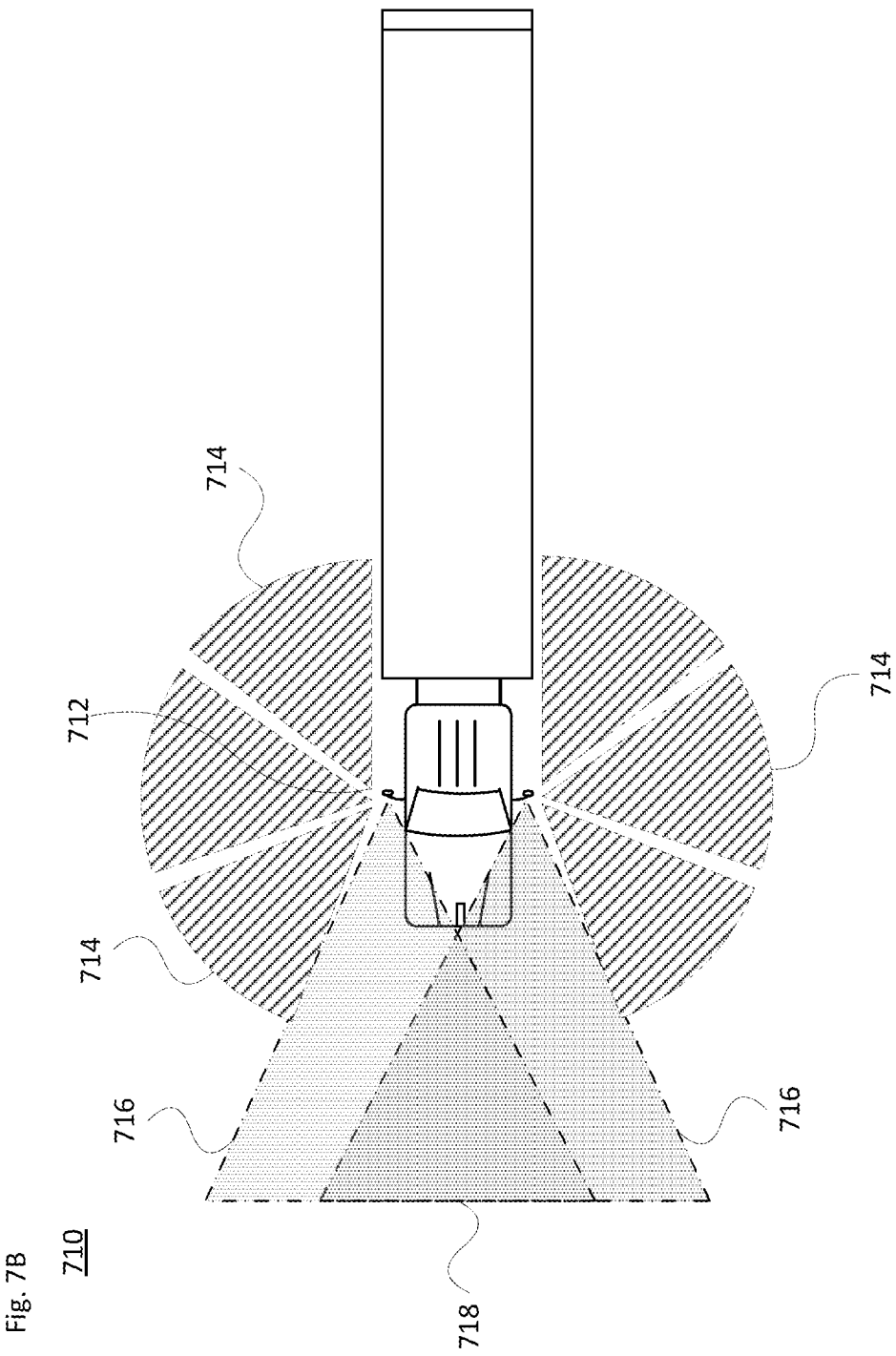
FIG. 7B is an example of radar or camera coverage for a tractor-trailer vehicle in accordance with aspects of the disclosure.

Examples of Lidar, camera and radar sensors are shown in FIGS. 7A and 7B. In FIG. 7A, one or more Lidar units may be located in sensor housing 702. In particular, a pair of sensor housings 702 may be located on either side of the tractor unit cab, for instance integrated into a side view mirror assembly. In one scenario, long range Lidars may be located along a top or upper area of the sensor housings 702. For instance, this portion of the housing 702 may be located closest to the top of the truck cab or roof of the vehicle. This placement allows the long range Lidar to see over the hood of the vehicle. And short range Lidars may be located along a bottom area of the sensor housings 702, closer to the ground, and opposite the long range Lidars in the housings. This allows the short range Lidars to cover areas immediately adjacent to the cab. This would allow the perception system to determine whether an object such as another vehicle, pedestrian, bicyclist, etc. is next to the front of the vehicle and take that information into account when determining how to drive or turn. Both types of Lidars may be co-located in the housing, for instance aligned along a common vertical axis.

As illustrated in FIG. 7A, the long range Lidars on the left and right sides of the tractor unit have fields of view 704. These encompass significant areas along the sides and front of the vehicle. As shown, there is an overlap region 706 of their fields of view in front of the vehicle. A space is shown between regions 704 and 706 for clarity; however in actuality there is no break in the coverage. The short range Lidars on the left and right sides have smaller fields of view 708. The overlap region 706 provides the perception system with additional or information about a very important region that is directly in front of the tractor unit. This redundancy also has a safety aspect. Should one of the long range Lidar sensors suffer degradation in performance, the redundancy would still allow for operation in an autonomous mode.

FIG. 7B illustrates coverage 710 for either (or both) of radar and camera sensors on both sides of a tractor-trailer. Here, there may be multiple radar and/or camera sensors in each of the sensor housings 702. As shown, there may be sensors with side and rear fields of view 714 and sensors with forward facing fields of view 716. The sensors may be arranged so that the side and rear fields of view 714 overlap, and the side fields of view may overlap with the forward facing fields of view 716. As with the long range Lidars discussed above, the forward facing fields of view 716 also have an overlap region 718. This overlap region provides similar redundancy to the overlap region 706, and has the same benefits should one sensor suffer degradation in performance.

Figure 8A:
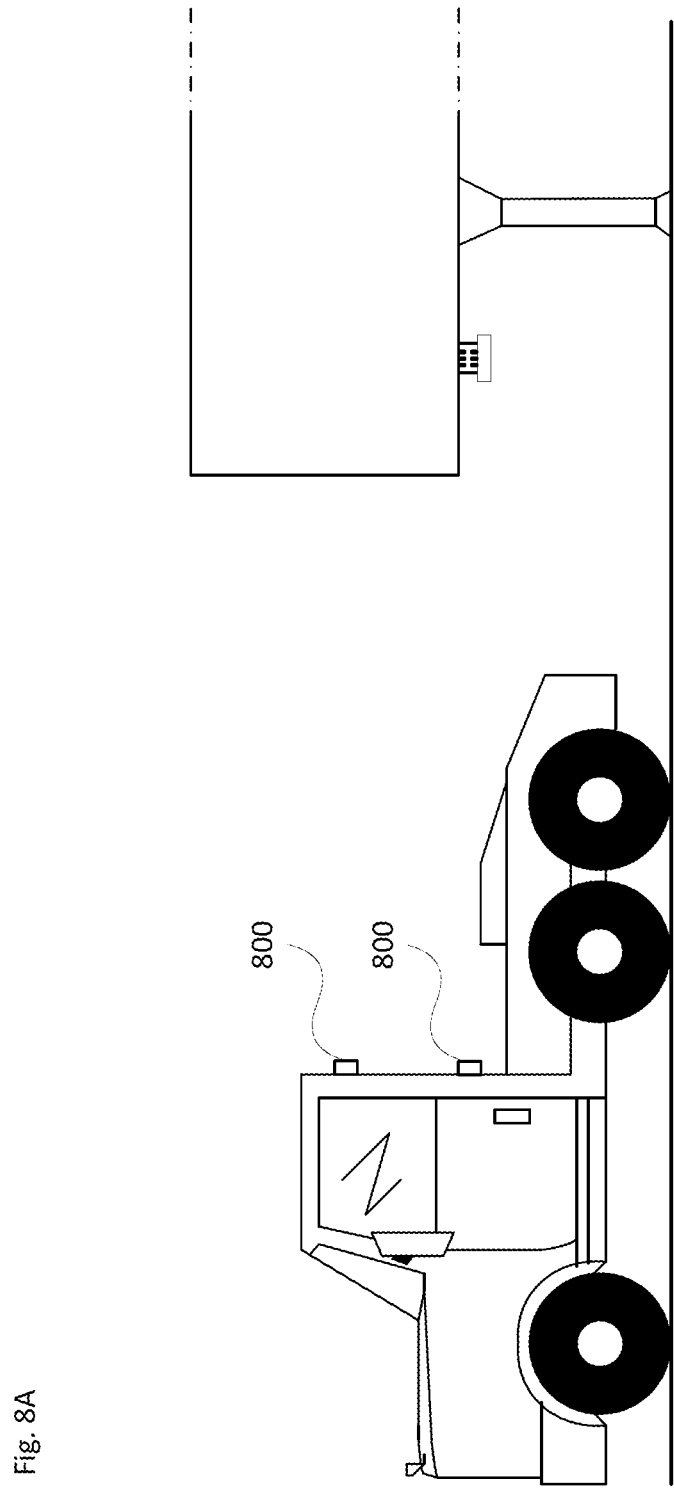
FIGS. 8A-C illustrate examples of rear sensor units in accordance with aspects of the disclosure.
Figure 8B:
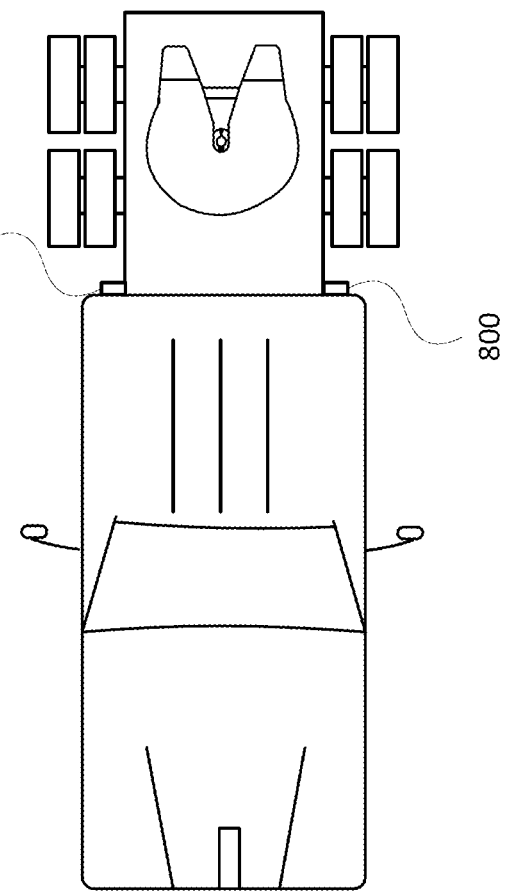
Figure 8C:
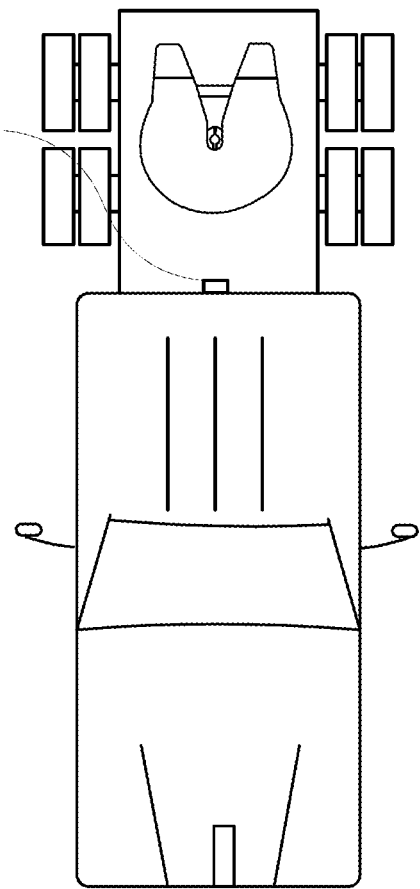

In addition to driving in an autonomous mode using information from the sensors in the sensor housings 702, the system also needs to couple and decouple the tractor unit and the trailer. In one scenario, the sensors of the sensor housings 702 may provide sufficient information to indicate the relative position and alignment of the tractor unit and the trailer. However, in another scenario, other sensors may be employed to provide this information. FIGS. 8A-C illustrate several examples. FIG. 8A is a side view of a tractor unit and a portion of a trailer to which the tractor unit will couple. As shown, one or more rear sensors 800 are provided on the back of the cab, which are used to identify the relative positioning of the trailer to the tractor unit, so that the fifth-wheel can be aligned and capture the kingpin. By way of example, the rear sensor(s) 800 may include Lidar sensors, camera sensors, or both. Other sensors may also be employed, such as sonar and/or radar.

FIGS. 8B and 8C are top-down views of the tractor unit, with variations on the location(s) for the rear sensor(s) 800. As shown in FIG. 8B, a pair of rear sensors 800 may be disposed on the left and right sides of the back of the cab. And as shown in FIG. 8C, one rear sensor 800 may be disposed centrally on the back of the cab. The exact position, height and orientation of the rear sensor(s) 800 may depend on the specific configuration of the cab and/or the type of trailer to be hitched to the tractor unit.

Figure 9B:
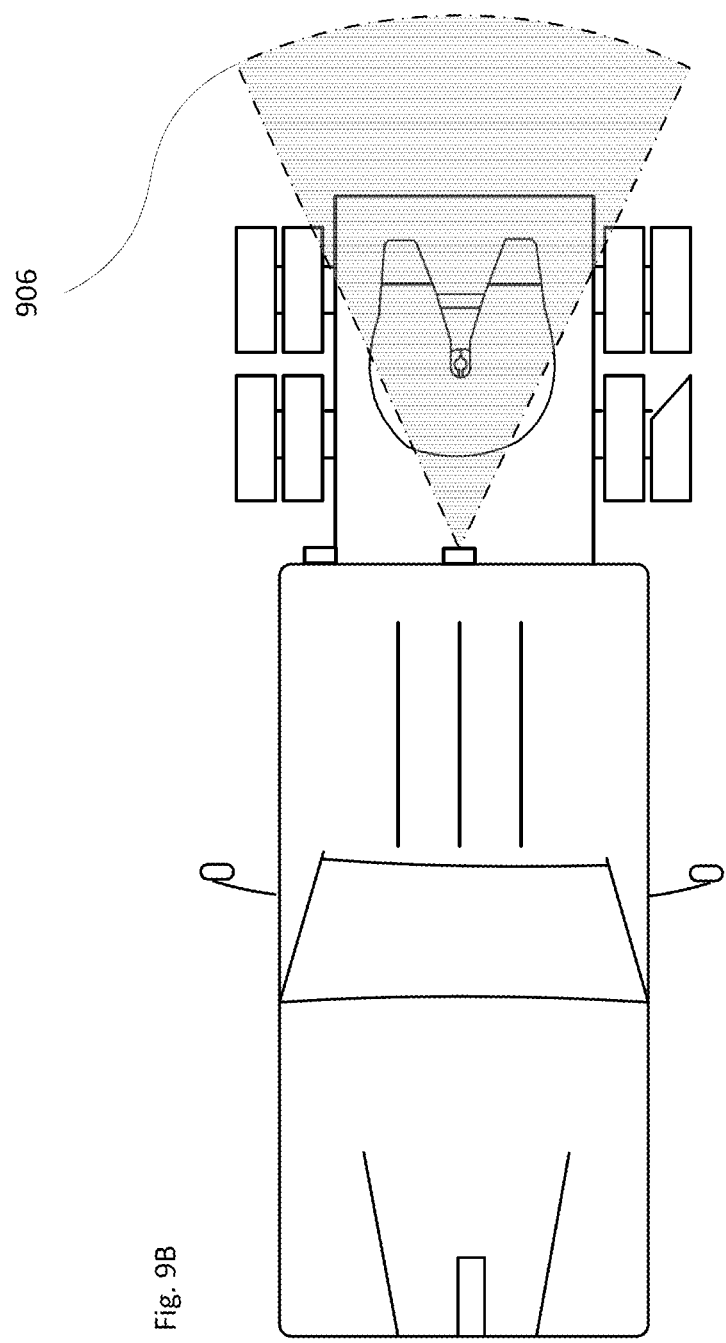

FIGS. 9A and 9B illustrate sensor coverage. For instance, as shown in FIG. 9A, a pair of rear sensors may be employed. Here, fields of view 900 from side sensors mounted on the rear view mirror assemblies may not encompass the region toward the rear of the cab, and thus may not be able to provide sufficient information about the alignment of the trailer kingpin to the fifth-wheel. However, the fields of view 902 from the rear sensors do capture the necessary information, and provide an overlapping field of view 904. This overlapping field of view 904 may provide enhanced resolution or other additional information to assist when coupling the fifth-wheel to the kingpin. And in the example of FIG. 9B, a single, centrally located sensor has a field of view 906.

The information obtained by the rear sensors, as well as from other sensors of the system, is used by the tractor unit's processing system(s) to align the vehicle's wheels, to back up the tractor unit and to properly connect the fifth-wheel and kingpin. In one scenario, the trailer hitch includes one or more easily visible markings or beacon elements for a camera, Lidar or other sensor of the tractor unit to hone in on. This could make it easier on the perception system to find where the hitch is. By way of example, the trailer may include highly reflective strips or other retroreflectors placed in a specific manner (pattern) along the front face so that the rearward facing cameras or Lidars of the tractor unit are able to rapidly identify them and use that information to align the tractor unit to the trailer. In addition to such visual indicia, other passive elements or even active transmissive beacons, e.g., optical or infrared light emitting diodes (LEDs), or audible transmitters such as a tone generator for use with a sonar sensor at the tractor unit, may be employed.

Figure 10:
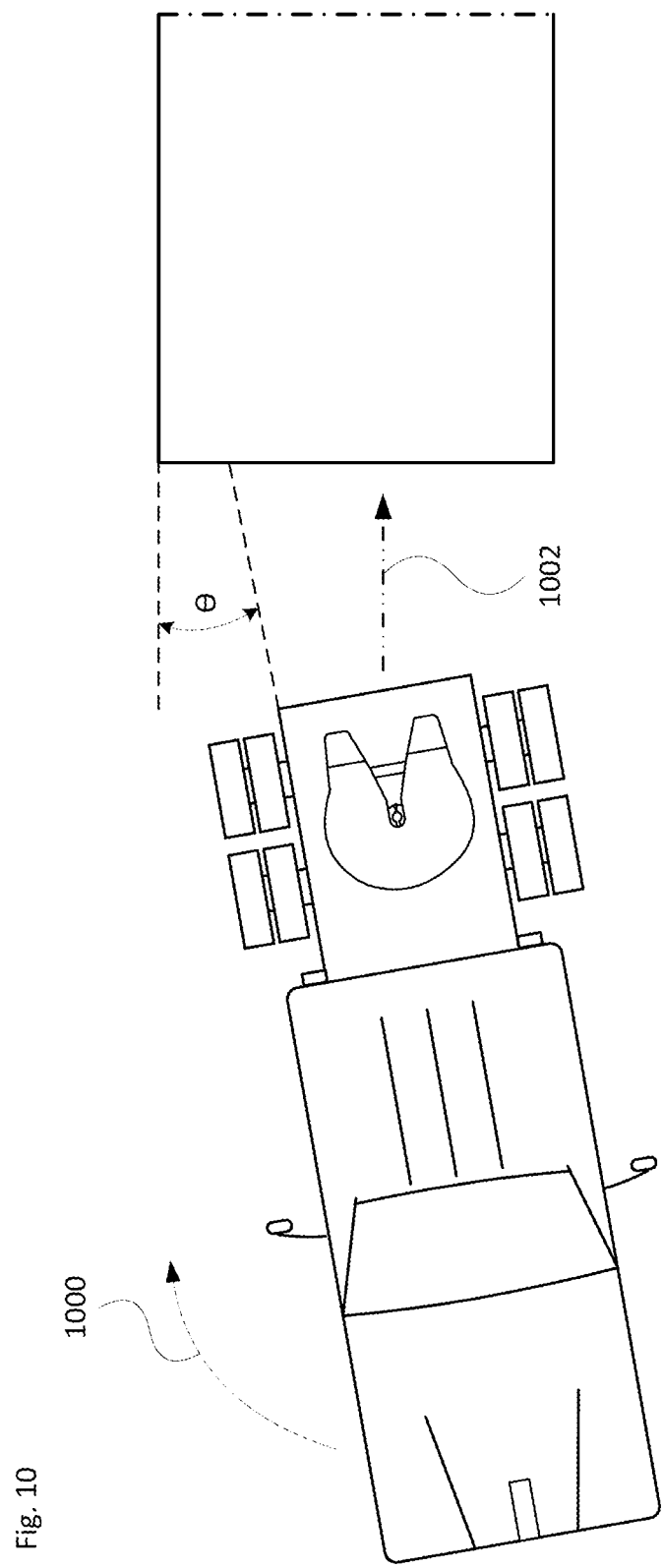
FIG. 10 illustrates an example of autonomous hitching of a tractor unit to a trailer in accordance with aspects of the disclosure.

FIG. 10 illustrates a situation where the tractor unit is initially not aligned with the trailer. As shown in this birds-eye view, the tractor unit may be disposed at some non-zero degree angle Θ relative to the trailer. Using the sensor information, the tractor unit can, in an autonomous mode, angle the front wheels as shown by arrow 1000 to adjust the alignment closer to parallel with the trailer. And the tractor unit can also back up in the autonomous mode as shown by arrow 1002. Once properly aligned and positioned, the coupling mechanism of the fifth-wheel engages the kingpin. At this point, the couplings between the fifth-wheel and kingpin are made and air, power and data may be provided as described above.

Figure 11A:
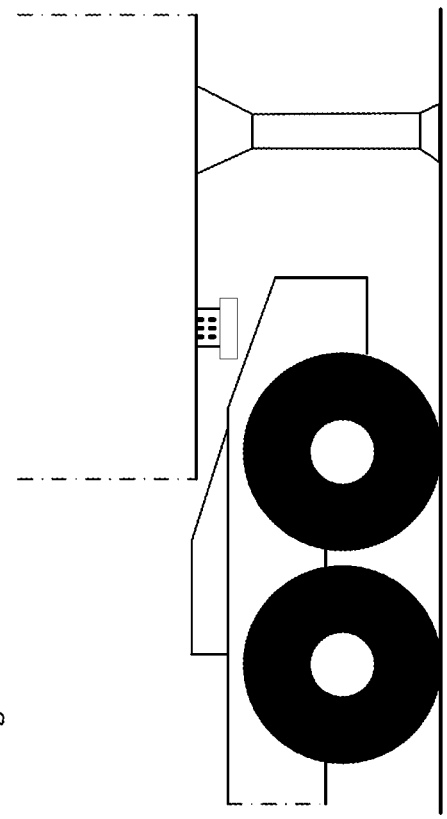
FIGS. 11A-C illustrate relative positioning of the kingpin and fifth-wheel in accordance with aspects of the disclosure.
Figure 11B:
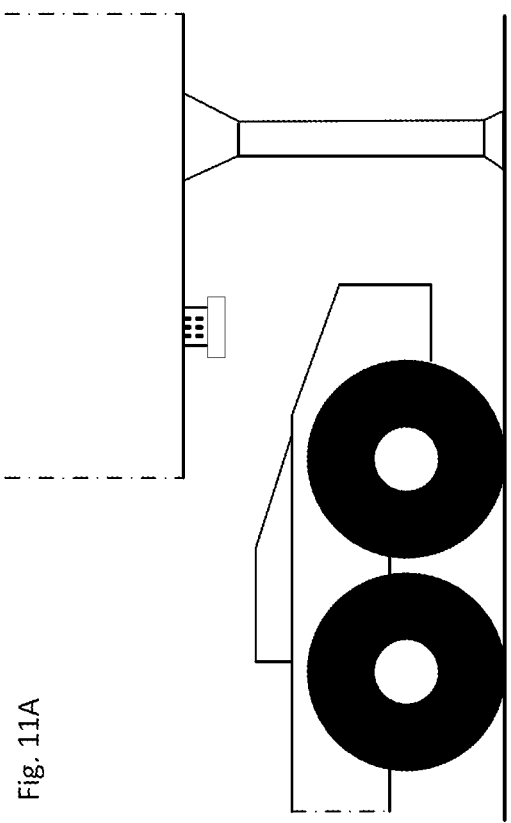
Figure 11C:
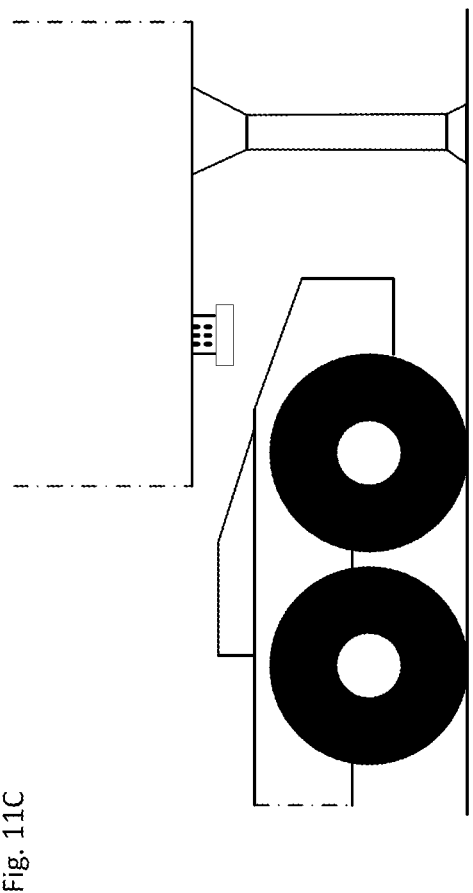

When coupling the tractor unit to the trailer, the landing gear of the trailer are positioned in a deployed state to support and stabilize the trailer. As the tractor unit approaches (e.g., backs towards) the trailer, it may be determined from sensor or other information that the kingpin is too high (FIG. 11A) or too low (FIG. 11B) relative to the fifth-wheel. This may occur due to a slope of the land or other environmental features. In order to ensure proper height alignment (FIG. 11C) of the fifth-wheel and kingpin, the tractor unit operating in an autonomous mode may make certain adjustments. For instance, this might include changing the height of the fifth-wheel via an air suspension system.

Once the trailer is connected to the tractor unit, the control system (e.g., 202 of FIG. 2A) may signal to the trailer ECU to retract the landing gear so that they do not interfere with driving (see FIG. 1D). Conversely, when the trailer is to be detached from the tractor unit, the ECU causes the landing gear to extend until they contact the ground (see FIG. 1E). Adjustment of the landing gear may be done via electromechanical, pneumatic or hydraulic mechanisms. For instance, the landing gear can be controlled electronically by the tractor once the tractor unit and the trailer are hitched or otherwise connected as described above. This is very useful as until the landing gear are lifted or otherwise retracted, the trailer cannot be moved. Conversely, the trailer needs to have proper support before the tractor unit drives away.

In one example, one or more electric motors can be used to lift and lower the landing gear. However, such motors might need to be fairly large and powerful. In this case, the electrical connection between the trailer and tractor unit may not be able to support a large current draw to power the motors. Alternatively, the system could employ air power, for instance available as part of the braking system, to lift and lower the landing gear. The electrical or air-powered control of the landing gear may be accomplished as described above via the fifth-wheel and kingpin connection. These landing gear operations could be controlled electronically via valves, such as check valves 608 or equivalent valve connections, which reside on the trailer. Furthermore, even trailers that are not intended to interface with autonomous vehicles or have hitch structures as described herein may be capable of benefitting from having such air powered landing gear.

In addition, in one scenario once the trailer and tractor unit are coupled, the trailer is able to communicate with the tractor unit about its status. For instance, the trailer can identify faults, failures or other known conditions. The trailer can also indicate which trailer it is (e.g., with a unique reference number) or whether it is the first, second or third trailer in a tandem arrangement. Sensor and cargo information may also be provided by the trailer to the tractor unit. Sensor data such as information from on-board Lidar, radar, camera (e.g., visual, infrared, or night-vision), sonar, wheel speed sensors and the like may be transmitted, e.g., via a CAN bus or other communication arrangement as discussed herein. Similarly, information about the cargo, including cargo type(s), weight, size, footprint and stacking arrangements along the trailer, whether any cargo is perishable, subject to security or hazard protocols, etc., may be communicated to the tractor unit.

Figure 12:
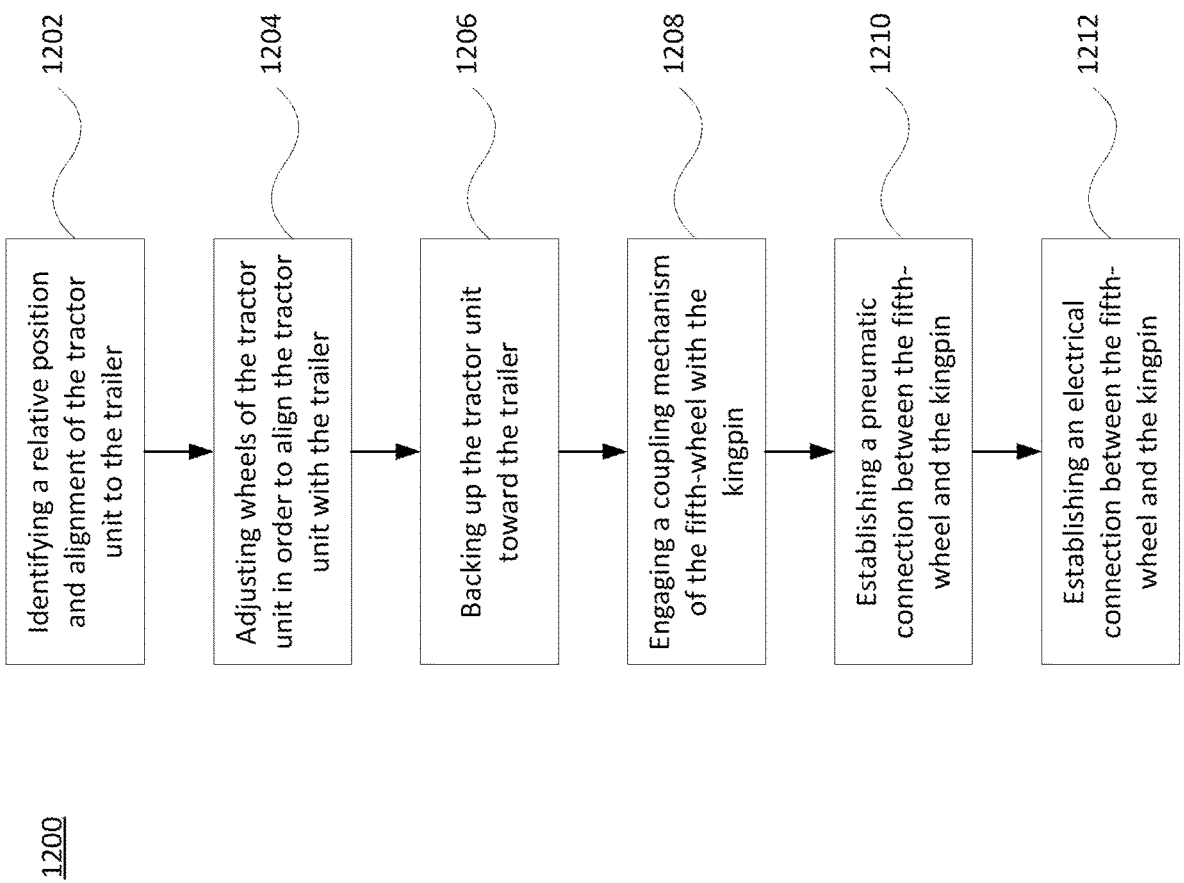
FIG. 12 illustrates a method of coupling a tractor unit to a trailer in accordance with aspects of the disclosure.

FIG. 12 provides an example method 1200 of coupling a tractor unit to a trailer. Per block 1202, the system identifies a relative position and alignment of the tractor unit to the trailer. This includes using at least one sensor of the tractor unit to detect information about the trailer so that the system can determine the relative position and alignment. In response to the position and alignment information, wheels of the tractor unit are adjusted in order to align the tractor unit with the trailer, as shown in block 1204. Then, in block 1206, upon adjusting the wheels, the tractor unit is backed up toward the trailer. The system may continue to receive information from the sensor(s) and use that information to adjust wheel alignment as the tractor unit backs up. Once the tractor unit is close enough, a coupling mechanism of the fifth-wheel is engage with the kingpin of the trailer, as indicated in block 1208. The system then establishes a pneumatic connection (block 1210) and an electrical connection (block 1212) between the fifth-wheel and the kingpin in the manner described above. At this point, a control system or other subsystem of the vehicle may check the status of the trailer or its cargo, and prepare for driving in an autonomous or non-autonomous mode.

Figure 13:
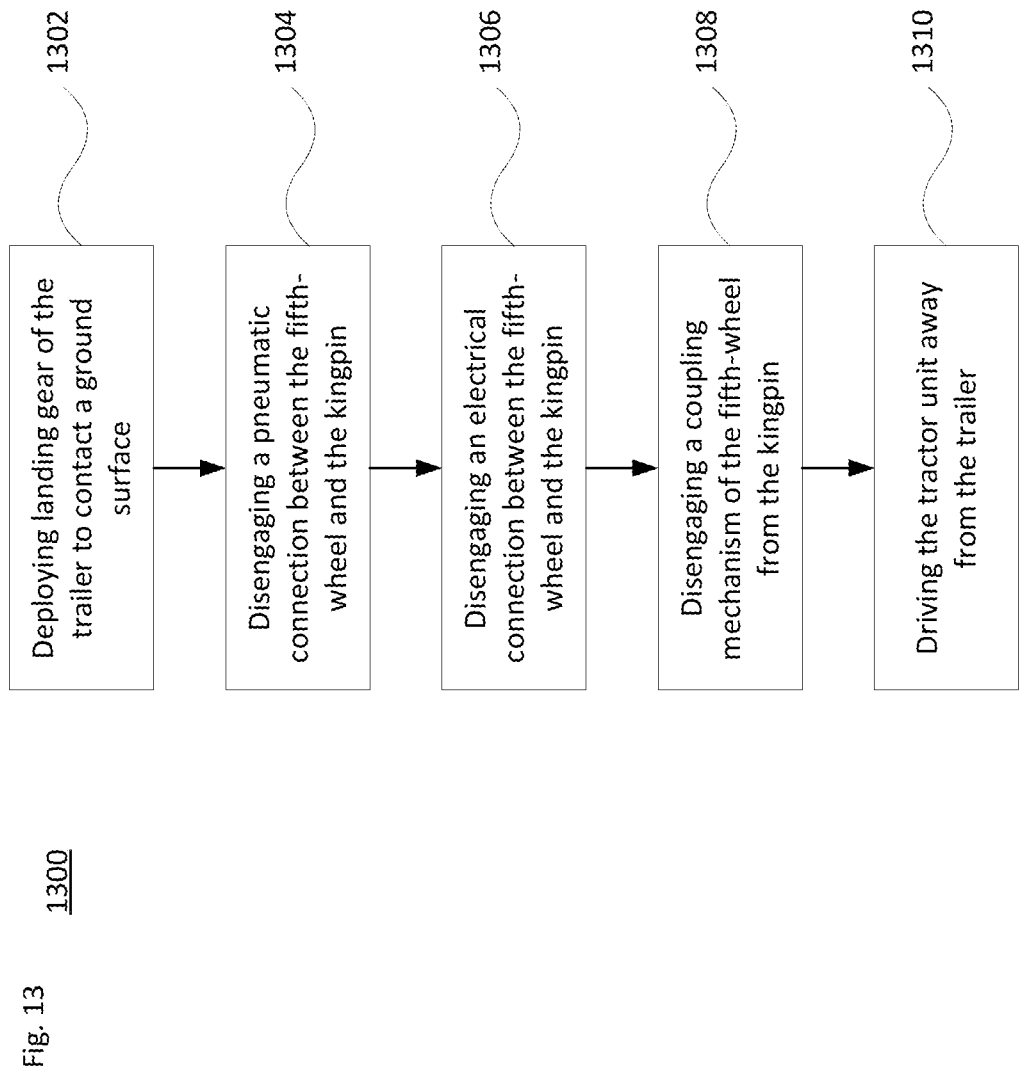
FIG. 13 illustrates a method decoupling a tractor unit from a trailer in accordance with aspects of the disclosure.

FIG. 13 provides an example method 1300 of decoupling the tractor unit from the trailer. Per block 1302, the landing gear of the trailer are deployed to contact a ground surface. This will provide a stable base once the tractor unit is disengaged from the trailer. The pneumatic connection (block 1304) and the electrical connection (block 1306) between the fifth-wheel and the kingpin are disengaged. At block 1308, the coupling mechanism is decoupled from the kingpin. And at block 1310, the tractor unit can be driven away from the trailer.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method of coupling a tractor unit of a vehicle configured to operate in an autonomous mode to a trailer, the method comprising:
   identifying, by one or more processors, a relative position and alignment of the tractor unit to the trailer, the trailer including at least one air-powered landing gear deployed to contact a ground surface used to support the trailer;
   in response to the relative position and alignment, causing, in the autonomous mode, adjusting of one or more wheels of the tractor unit in order to align the tractor unit with the trailer;
   upon adjusting the one or more wheels, causing, in the autonomous mode, the tractor unit to move toward the trailer;
   causing, in response to the movement of the tractor unit while in the autonomous mode, engagement of a coupling mechanism of a fifth-wheel of the tractor unit with a kingpin of the trailer;
   causing, in the autonomous mode, establishment of a pneumatic connection between the fifth-wheel of the tractor unit and a connection section of the trailer, the connection section of the trailer being connected to the kingpin via one or more air lines and one or more check valves; and
   causing, in the autonomous mode, actuation of the one or more check valves to initiate retraction of the at least one air-powered landing gear from the ground surface.

2. The method of claim 1, further comprising, upon retraction of the at least one air-powered landing gear, driving the tractor unit in the autonomous driving mode with the trailer coupled thereto.

3. The method of claim 1, wherein the retraction is accomplished by a control system of the tractor unit providing a retraction signal to an electronic control unit of the trailer.

4. The method of claim 1, wherein identifying the relative position and alignment of the tractor unit to the trailer is performed by the one or more processors based on received sensor data.

5. The method of claim 4, wherein the received sensor data is obtained from one or more sensors disposed along the tractor unit.

6. The method of claim 4, wherein the received sensor data is obtained from one or more sensors disposed along the trailer.

7. The method of claim 1, further comprising establishing an electrical connection between the fifth-wheel of the tractor unit and the kingpin of the trailer upon engagement between the fifth-wheel and the kingpin.

8. The method of claim 7, further comprising, upon establishing the electrical connection, a control system of the tractor unit obtaining status information of the trailer from an electronic control unit of the trailer.

9. The method of claim 8, wherein the status information identifies whether the trailer is part of a tandem arrangement with one or more other trailers.

10. The method of claim 8, wherein the status information identifies information about cargo of the trailer.

11. The method of claim 10, wherein the information about the cargo includes at least one of weight, size, footprint or stacking arrangement.

12. The method of claim 10, wherein the information about the cargo indicates whether any of the cargo is perishable.

13. The method of claim 10, wherein the information about the cargo indicates whether any of the cargo is subject to a security protocol or a hazard protocol.

14. The method of claim 1, further comprising adjusting a height of the fifth-wheel relative to the kingpin prior to engagement of the coupling mechanism.

15. A method of decoupling a tractor unit of a vehicle configured to operate in an autonomous mode from a trailer, the method comprising:
   causing, in the autonomous mode, actuation of one or more check valves configured to connect one or more air lines between a connection section of the trailer and a kingpin of the trailer in order to deploy at least one air-powered landing gear of the trailer to contact a ground surface used to support the trailer;
   in response to causing the actuation of the one or more check valves, causing, in the autonomous mode, disengagement of a pneumatic connection between a fifth-wheel of the tractor unit and the connection section of the trailer while the tractor unit is operating in the autonomous mode; and
   causing, in the autonomous mode, disengagement of a coupling mechanism of the fifth-wheel of the tractor unit from the kingpin of the trailer while the tractor unit is operating in the autonomous mode.

16. The method of claim 15, further comprising, upon disengagement of the coupling mechanism from the kingpin, driving the tractor unit away from the trailer in an autonomous driving mode.

17. The method of claim 15, further comprising disengaging a power connection between the fifth-wheel of the tractor unit and the kingpin of the trailer.

18. The method of claim 15, further comprising adjusting a height of the fifth-wheel relative to the kingpin after disengagement of the coupling mechanism.

19. The method of claim 15, wherein deployment of the at least one air-powered landing gear to contact the ground surface is accomplished by a control system of the tractor unit providing a deploying signal to an electronic control unit of the trailer.

20. The method of claim 15, wherein prior to disengagement of the coupling mechanism, the method further includes a control system of the tractor unit obtaining positional information via the kingpin in order to determine a relative alignment of the trailer to the tractor unit.

* * * * *